(12) United States Patent
Uchiyama et al.

(10) Patent No.: US 9,513,417 B2
(45) Date of Patent: Dec. 6, 2016

(54) OPTICAL FILTER AND OPTICAL APPARATUS

(71) Applicant: CANON DENSHI KABUSHIKI KAISHA, Chichibu-shi (JP)

(72) Inventors: Masayuki Uchiyama, Honjo (JP); Michio Yanagi, Chichibu (JP)

(73) Assignee: Canon Denshi Kabushiki Kaisha, Chichibu-shi (JP)

( * ) Notice: Subject to any disclaimer, the term of this patent is extended or adjusted under 35 U.S.C. 154(b) by 0 days.

(21) Appl. No.: 14/443,191

(22) PCT Filed: Nov. 18, 2013

(86) PCT No.: PCT/JP2013/081080
§ 371 (c)(1),
(2) Date: May 15, 2015

(87) PCT Pub. No.: WO2014/077399
PCT Pub. Date: May 22, 2014

(65) Prior Publication Data
US 2015/0268394 A1 Sep. 24, 2015

(30) Foreign Application Priority Data

Nov. 16, 2012 (JP) .................................. 2012-252698
Nov. 16, 2012 (JP) .................................. 2012-252709

(51) Int. Cl.
*G02B 5/22* (2006.01)
*G02B 1/115* (2015.01)
(Continued)

(52) U.S. Cl.
CPC ................. *G02B 5/22* (2013.01); *G02B 1/115* (2013.01); *G02B 1/118* (2013.01); *G02B 3/0087* (2013.01); *G02B 5/205* (2013.01); *G03B 11/00* (2013.01)

(58) Field of Classification Search
CPC .......... G02B 5/22; G02B 5/28; G02B 5/205; G02B 3/0087
USPC .................................................. 359/885, 888
See application file for complete search history.

(56) References Cited

U.S. PATENT DOCUMENTS 4,826,267 A  5/1989  Hall et al.
6,010,756 A * 1/2000  Gasworth ........... C23C 16/5096
                                                        427/162

(Continued)

FOREIGN PATENT DOCUMENTS

JP  08-075902 A  3/1996
JP  08-083581 A  3/1996

(Continued)

OTHER PUBLICATIONS

Dec. 17, 2013 International Search Report in International Patent Appln. No. PCT/JP2013/081080.

*Primary Examiner* — Darryl J Collins
(74) *Attorney, Agent, or Firm* — Fitzpatrick, Cella, Harper & Scinto

(57) ABSTRACT

Regarding an optical filter comprising a light-transmitting substrate, a gradient refractive index thin film with a refractive index change in the film thickness direction formed on the substrate and an anti-reflection structure formed on the gradient refractive index thin film, the gradient refractive index thin film is formed so as to have light absorbing characteristic and a refractive index characteristic such that the refractive index change comprising plural changing points with increases and decreases of the refractive index has a tendency to reduce from the side of the substrate toward the side of the anti-reflection structure. The optical filter has excellent environmental resistance and low reflection. The optical filter can be suitably used in an imaging optical system of an optical apparatus or a display of an electronic device.

18 Claims, 13 Drawing Sheets

(51) Int. Cl.
*G02B 1/118* (2015.01)
*G02B 5/20* (2006.01)
*G02B 3/00* (2006.01)
*G03B 11/00* (2006.01)

(56) References Cited

U.S. PATENT DOCUMENTS

| | | |
|---|---|---|
| 6,961,183 B2 | 11/2005 | Wada et al. |
| 8,917,369 B2 | 12/2014 | Yamada et al. |
| 2005/0012999 A1 | 1/2005 | Wada et al. |
| 2008/0297932 A1* | 12/2008 | Uchiyama ............... G02B 1/118 359/888 |
| 2012/0147303 A1 | 6/2012 | Yamada et al. |
| 2014/0071552 A1 | 3/2014 | Uchiyama et al. |
| 2014/0085729 A1 | 3/2014 | Uchiyama et al. |
| 2015/0168712 A1 | 6/2015 | Sato et al. |

FOREIGN PATENT DOCUMENTS

| | | |
|---|---|---|
| JP | 2002-267815 A | 9/2002 |
| JP | 2004-310008 A | 11/2004 |
| JP | 2009-122216 A | 6/2009 |
| JP | 2010-277094 A | 12/2010 |
| JP | 2013-033241 A | 2/2013 |
| WO | 2010/150615 A1 | 12/2010 |
| WO | 2012/157719 A1 | 11/2012 |

* cited by examiner (A)

(B)

(a)

(b)

(a)

(b)

OPTICAL FILTER AND OPTICAL APPARATUS

TECHNICAL FIELD

The present invention relates to an optical filter having a light-absorbing thin film and a fine structure in this order on a light-transmitting substrate, and to an optical apparatus having an imaging optical system including the optical filter.

BACKGROUND ART

Many optical filters for use in various applications have problems caused by reflection of the filters themselves. For example, in some cases, an optical filter for use in an imaging optical system involves a phenomenon that part of light transmitted through the filter is reflected by another member and re-enters the optical filter from a light emitting surface of the optical filter. In such a case, if the optical filter has a reflectance in a wavelength region of the incident light, the light reflected by another member and re-entered is reflected again by the optical filter. As a result, a problem caused by the light reflected by the optical filter occurs. Therefore, further enhancement of the anti-reflection function of the optical filter has been strongly desired.

A light-absorbing-type optical filter including an absorbent structure, whose surface reflectance is made close to zero as far as possible, can also provide desired transmission characteristics by adjusting light-absorbing characteristics.

In general, as such an optical filter of the type having absorption in a desired wavelength region, an absorption-type ND (Neutral Density) filter for use in a light diaphragm device is widely known.

The following methods have been known for reflection reduction. Patent Literature 1 proposes a method of suppressing the reflectance of any wavelength region, for example, by laminating several types of thin films each having the different refractive indexes and being made of different materials such as $SiO_2$, $MgF_2$, $Nb_2O_5$, $TiO_2$, $Ta_2O_5$, and $ZrO_2$ to form a multi-layer film-type anti-reflection film. In addition, Patent Literature 2 discloses an ND filter using a fine periodic structure as an anti-reflection structure. Further, Patent Literature 3 proposes a method of improving transmission flatness as an example to obtain the desired spectral reflectance characteristics in a light-absorbing film.

PRIOR ART REFERENCE

Patent Literature

Patent Literature 1: JP08-075902A
Patent Literature 2: JP2009-122216A
Patent Literature 3: JP2010-277094A However, in a case of an anti-reflection film using a multi-layer film as disclosed in Patent Literature 1, in order to significantly reduce the reflectance over a wide wavelength region, only limited materials can be used as the thin film materials for making the multi-layer film. Therefore, such a structure requires a substantial number of layers or complicates the design.

When the anti-reflection structure of the ND filter has a fine periodic structure formed at a sub-micron pitch as disclosed in Patent Literature 2, it is relatively easier to expand the anti-reflection wavelength region and further easier to reduce the reflectance than the multi-layer film structure disclosed in Patent Literature 1. However, the structure to provide the fine periodic structure on the substrate disclosed in Patent Literature 2 may cause a problem with light reflection at an interface thereof. In addition, for example, even in a light-absorbing layer made of a multi-layer thin film, in a case light reflection occur between each thin films, it is extremely difficult to reduce the reflection of the overall ND filter close to zero as far as, by offsetting all light reflection occurring between structures of the ND filter only by interference effects.

Patent Literature 3 proposes a method of increasing transmittance flatness using absorbent materials with small dispersion characteristics in a desired wavelength region.

It is an object of the present invention to provide an optical filter that reduces problems caused by reflectance of a light-absorbing optical filter as described above. It is another object of the present invention to obtain an optical filter that can improve transmittance flatness with good productivity. It is another object to provide an optical apparatus capable of realizing high precision such as high-quality image by using such optical filter with low refraction and absorption in an imaging optical system to reduce defects caused by reflectance of the filter such generation of ghost.

Means for Solving the Problems

A first embodiment of the optical filter according to the present invention is characterized in comprising:
a light-transmitting substrate,
a gradient refractive index thin film with the refractive index change in the film thickness direction formed on the substrate, and
an anti-reflection structure formed on the gradient refractive index thin film,
wherein the gradient refractive index thin film has light absorption property and a gradient refractive index property such that the refractive index change comprising plural changing points, each of which has an increase and a decrease of the refractive index, has a tendency to reduce from the side of the substrate toward the side of the anti-reflection structure.

A second embodiment of the optical filter according to the present invention is characterized in comprising:
a light-transmitting substrate, and
a light-absorbing gradient refractive index thin film with the refractive index change in the film thickness direction formed on the substrate and an anti-reflection structure formed on the gradient refractive index thin film, which are formed on the substrate,
wherein the refractive index change of the gradient refractive index thin film comprises plural slope-changing regions of the refractive index, each of which has a portion where the slope of the increasing rate of the refractive index changes from plus to minus as a local maximum value point, and
wherein the relation of the refractive index of the substrate, the refractive indexes of the local maximum values points corresponding to the plural slope-changing regions and the refractive index of the anti-reflection structure comprises a monotonous increase and a monotonous decrease from the side of the substrate toward the side of the anti-reflection structure.

An optical apparatus according to the present invention using an optical filter is characterized in that the optical filter has the above structure.

Effects of Invention

An optical filter with reduced reflection and excellent absorption property by reducing reflection can be obtained by the present invention. The use of the optical filter in the imaging optical system can remarkably reduce problems such as ghost caused by reflection of the filter, and, thus, an imaging optical system can be provided, in which transmitted light quantity can be well limited. A device capable of making an image with high-quality can be obtained by an imaging device using such optical filter, in particular, in an optical diaphragm device.

MEANS FOR SOLVING THE PROBLEMS

An optical filter according to the present invention comprises a light-transmitting substrate, a light-absorbing gradient refractive index thin film formed on the substrate and an anti-reflection structure formed on the gradient refractive index thin film.

The substrate used for the invention has strength and optical characteristics as the substrate of the optical filter, and can function as a base for forming the gradient refractive index thin film and the anti-reflection structure. The examples of the substrate includes a substrate made of a glass-based material such as BK7 or SFL-6; a substrate made of a resin material selected from PET (polyethylene terephthalate), PEN (polyethylene naphthalate), PES (polyether sulfone), PC (polycarbonate), PO (polyolefin), PI (polyimide), PMMA (polymethyl methacrylate) and TAO (triacetyl cellulose). A substrate made of a composite material of a glass substrate and a resin layer and an organic and inorganic hybrid substrate comprising mixture of an organic material and an inorganic material can be used. As the optical characteristics of the substrate, the total light transmittance of the substrate in the visible light wavelength region is preferably 89% or more than 89%, more preferably 91% or more than 91%. When the resin material substrate is used, in particular, the total light transmittance is preferably 89% or more than 89%.

The gradient refractive index thin film is a light-absorbing thin film and is placed between the substrate and the anti-reflection structure in the thickness direction thereof. The light-absorbing property of the gradient refractive index thin film is set according to the functions and characteristics of the intended optical filter. The gradient refractive index thin film has the light-absorbing property and a gradient refractive index property such that the refractive index change comprises plural changing points, each of which has an increase and a decrease of the refractive index, reducing from the side of the substrate toward the side of the anti-reflection structure. As a result, light absorption can be controlled together with reduction of reflection. The gradient refractive index thin film comprises preferably a region with refractive index of 1.8 or more, for example for the light absorbing-property.

The gradient refractive index thin film preferably has a refractive index change comprising a continuous and periodical change in a thickness direction thereof. The refractive index change comprises:

(I) a portion where, on the substrate side, the refractive index changes so as to be close to the refractive index of the substrate until the end point on the substrate side of the refractive index change; and (II) a portion where, on the anti-reflection structure side, the refractive index changes so as to be close to the refractive index of the anti-reflection structure until the end point on the anti-reflection structure side of the refractive index change.

Figure 1:
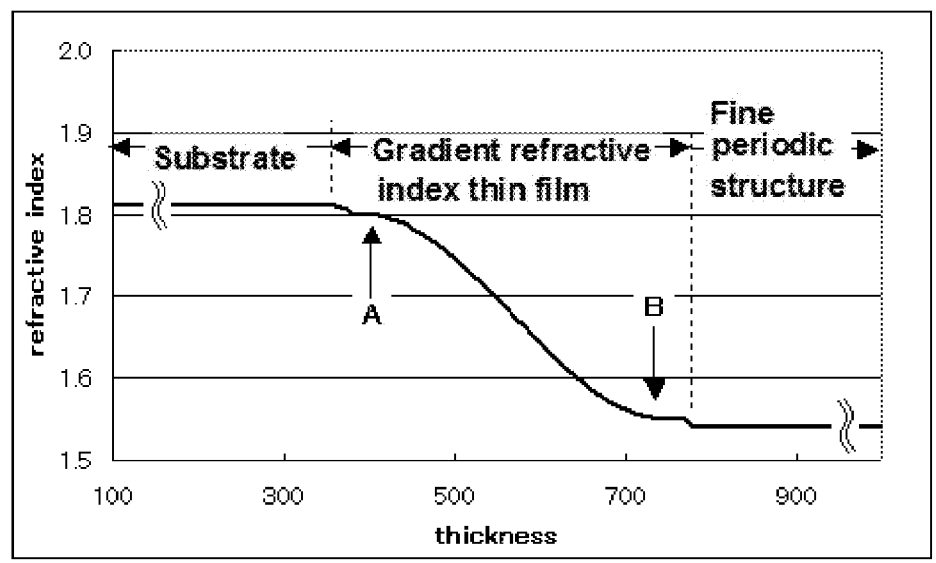
FIG. 1 illustrates an example of a refractive index profile of a gradient refractive index thin film according to the present invention.

The above end point on the substrate side of the refractive index change is indicated, for example, by point "A" in FIG. 1, and the above end point on the anti-reflection structure side is indicated by point "B". In the example illustrated in FIG. 1, regarding a terminal portion including end point (or start point) "A" on the substrate side of the refractive index distribution change, in the terminal portion including point "A", the refractive index of the gradient refractive index thin film changes so as to be close to the refractive index of the substrate. Likewise, regarding a terminal portion including end point (or start point) "B" on the anti-reflection structure side of the refractive index distribution change, in the terminal portion including point "B", the gradient refractive index thin film also changes so as to be close to the refractive index of the anti-reflection structure. Point "A" may be positioned on the interface on the substrate side. Point "B" may be also positioned on the interface on the anti-reflection structure side.

Depending on the film forming method, a portion with a constant refractive index, such as an initial portion of the gradient refractive index thin film formed from the stating point on the substrate side in the film thickness direction, or the last portion of the thin film on the side of the anti-reflection structure (for example the fine structure side), may be formed. For example, as described later, when the gradient refractive index thin film is formed on the substrate, the mixing ratio of a plurality of thin film forming-materials is changed to form a continuous change of the refractive index in the film thickness direction. At this time, after a certain time has elapsed since the film formation started with a certain constant film forming-material concentration, the mixing ratio of the plurality of thin film forming-materials can be changed. In this case, a portion as described above can be formed, without a change in refractive index in the thickness direction.

The refractive index at the end point of the refractive index change on the substrate side is equal to the refractive index of the substrate or may be a refractive index in a range of the refractive index difference allowed according to the characteristics of the intended optical filter with respect to the refractive index of the substrate. Likewise the refractive index at the end point (or start point) of the refractive index change on the anti-reflection structure side is equal to the refractive index of the anti-reflection structure or may be a refractive index in a range of the refractive index difference allowed according to the characteristics of the intended optical filter in a wavelength of the transmitted light or a wavelength region thereof with respect to the refractive index of the anti-reflection structure (e.g., a fine structure). These refractive index differences are preferably 0.05 or less. Thus, when a portion without a change in refractive index in the thickness direction as described above contacts the interface on the substrate side, the refractive index of the portion without a refractive index change preferably has a refractive index difference within 0.05 with respect to the refractive index of the substrate. This is also applied to the case where there is a portion without a change in refractive index in the thickness direction contacting the interface on the anti-reflection structure (e.g., a fine structure) side.

The refractive index difference between the end point of the refractive index change of the gradient refractive index thin film on the substrate side and the substrate may also be that allowed according to the characteristics of the intended optical filter, and the refractive index difference is preferably 0.05 or smaller than 0.05.

The width of change in the refractive index in the thickness direction of the gradient refractive index thin film can be variously set depending on the characteristics of the intended optical filter, the type of material for forming the gradient refractive index thin film, and a combination thereof. For example, in the film thickness direction of the gradient refractive index thin film, when three elements, for example Si, Al and O, are used and the refractive index is changed from a region made of $SiO_2$ to a region made of $Al_2O_3$ with strong gas barrier property, the refractive index can be changed within a range of about 1.47 to about 1.65. For example, when the three elements Si, Ti and O including Ti as a material changing light absorption property with its binding ratio with oxygen are used and when the refractive index is changed from a region made of $SiO_2$ to a region made of $TiO_2$, the refractive index can be changed within a range of about 1.47 to about 2.70.

The film thickness of the gradient refractive index thin film can be appropriately selected according to the intended function. The film thickness of the gradient refractive index thin film can be 10 nm to 4000 nm, and more preferably 100 nm to 1000 nm.

The anti-reflection structure (e.g., a fine structure) may have an anti-reflection function required to obtain the optical characteristics of a desired optical filter. As the anti-reflection structure, a fine structure comprising a recess-projection structure formed at a pitch shorter than the wavelength of visible light transmitted through the substrate, and an anti-reflection film formed by a multi-layer thin film can be used. The fine structure may have an anti-reflection function required to obtain the optical characteristics of a desired optical filter. The fine structure for use can be a fine structure having a surface where a large number of fine projections are arranged at a pitch shorter than the wavelength of visible light or a fine structure having a surface where repeated recesses and projections are provided at a pitch shorter than the wavelength of visible light. These fine structures includes a structure that reduces the refractive index difference between the structure and the air or the adjacent medium by means of randomly formed projections such as needle-like bodies and columnar bodies, and projected portions or recessed portions of a projection-recess structure finely formed in a staircase shape. These fine structures can be a fine structure selected from well-known fine structures according to the purpose. For example, the fine structure can be fabricated with good reproducibility using an optical nanoimprint method as long as the structure is a periodic structure made of a large number of projections arranged at a repetition period shorter than the wavelength of visible light transmitted through the substrate or a fine periodic structure having a periodic structure made of a recess-projection structure at a repetition period shorter than the wavelength of visible light transmitting the substrate.

Reflectance in an optical filter can be remarkably reduced by placing the substrate, the gradient refractive thin film with a continuous refractive index change in the film thickness direction and the anti-reflection structure expressing anti-reflection effect in a desired light wavelength adjacent in this order. According to the present invention, an absorption-type optical filter with reduced reflection can be obtained by a light absorption property and a gradient refractive index property comprising a tendency to reduce the refractive index change with light absorption property including plural changing points with increase and decrease of the refractive index from the side of the substrate toward the side of the anti-reflection structure.

In addition, reflectance of the interface between the anti-reflection structure and the gradient refractive index thin film and the interface of the gradient refractive index thin film and the substrate can be reduced by reducing the refractive index difference between each interface of the gradient refractive index thin film and each adjacent material. However, when the anti-reflection structure is formed by a single-layer film, interface reflection occurs between the air phase and the anti-reflection structure. Therefore, as the anti-reflection structure, a periodic fine structure reducible such interface reflection and an anti-reflection film formed by a multi-layer thin film, which can reduce such interface reflection as its total function of the anti-reflection structure, can be used.

When light enters into an interface where two materials having the difference refractive indexes are contacted, a part of the light is reflected and a part of the light is transmitted (refracted). Fresnel reflection means the reflection in the part of the light. This reflection depends on the refractive index difference and the incident angle.

For example, when light enters in the vertical direction into an interface from a medium of refractive index $n_1$ to a medium of refractive index $n_2$ and incident light intensity is $I_0$, reflection intensity I is $I=Io((n_1-n2)/(n_1+n_2)))^2$. Therefore, regarding the same incident angle, reflection (intensity) becomes small in proportion to $n_1$ and $n_2$ approach to the same value. When the refractive index continuously changes such as the gradient reflective index thin film, the reflection (intensity) is considered to be smaller by approximately reduce the refractive index difference in a film thickness unit.

Plural regions of high refractive index are necessary in the gradient refractive index thin film to obtain a desired absorption together with a desired transmittance property. For the reason as described above, it is important how the plural regions of high refractive index are arranged in the gradient refractive thin film to minimize the film thickness of the gradient refractive thin film. According to one embodiment of the present invention, the refractive index change of the gradient refractive index thin film comprises plural changing points (peaks) of refractive index, at each of which the slope of Increasing rate of the refractive index change turns from plus to minus in the refractive index change in the film thickness direction. The changing points (bottoms) at each of which the slope of the increasing rate turns from minus to plus are arranged between the adjacent peaks, respectively.

The examples of the arrangement of the three refractive index local maximum values according to the embodiment of the present invention are shown in Table 1.

TABLE 1

(a)

| No. | Sub | n1 | n2 | n3 | SWS |
|---|---|---|---|---|---|
| No. 1 | 1.5 | 3.0 | 2.5 | 2.0 | 1.0 |
| No. 2 | 1.5 | 3.0 | 2.0 | 2.5 | 1.0 |
| No. 3 | 1.5 | 2.5 | 3.0 | 2.0 | 1.0 |
| No. 4 | 1.5 | 2.5 | 2.0 | 3.0 | 1.0 |
| No. 5 | 1.5 | 2.0 | 3.0 | 2.5 | 1.0 |
| No. 6 | 1.5 | 2.0 | 2.5 | 3.0 | 1.0 |

(b)

| No. | Sub | n1 | n2 | n3 | n4 | SWS |
|---|---|---|---|---|---|---|
| No. 1 | 1.5 | 3.5 | 3.0 | 2.5 | 2.0 | 1.0 |
| No. 2 | 1.5 | 3.5 | 3.0 | 2.0 | 2.5 | 1.0 |
| No. 3 | 1.5 | 3.5 | 2.5 | 3.0 | 2.0 | 1.0 |
| No. 4 | 1.5 | 3.5 | 2.5 | 2.0 | 3.0 | 1.0 |
| No. 5 | 1.5 | 3.5 | 2.0 | 3.0 | 2.5 | 1.0 |
| No. 6 | 1.5 | 3.5 | 2.0 | 2.5 | 3.0 | 1.0 |
| No. 7 | 1.5 | 3.0 | 3.5 | 2.5 | 2.0 | 1.0 |
| No. 8 | 1.5 | 3.0 | 3.5 | 2.0 | 2.5 | 1.0 |
| No. 9 | 1.5 | 3.0 | 2.5 | 3.5 | 2.0 | 1.0 |
| No. 10 | 1.5 | 3.0 | 2.5 | 2.0 | 3.5 | 1.0 |
| No. 11 | 1.5 | 3.0 | 2.0 | 3.5 | 2.5 | 1.0 |
| No. 12 | 1.5 | 3.0 | 2.0 | 2.5 | 3.5 | 1.0 |
| No. 13 | 1.5 | 2.5 | 3.5 | 3.0 | 2.0 | 1.0 |
| No. 14 | 1.5 | 2.5 | 3.5 | 2.0 | 3.0 | 1.0 |
| No. 15 | 1.5 | 2.5 | 3.0 | 3.5 | 2.0 | 1.0 |
| No. 16 | 1.5 | 2.5 | 3.0 | 2.0 | 3.5 | 1.0 |
| No. 17 | 1.5 | 2.5 | 2.0 | 3.5 | 3.0 | 1.0 |
| No. 18 | 1.5 | 2.5 | 2.0 | 3.0 | 3.5 | 1.0 |
| No. 19 | 1.5 | 2.0 | 3.5 | 3.0 | 2.5 | 1.0 |
| No. 20 | 1.5 | 2.0 | 3.5 | 2.5 | 3.0 | 1.0 |
| No. 21 | 1.5 | 2.0 | 3.0 | 3.5 | 2.5 | 1.0 |
| No. 22 | 1.5 | 2.0 | 3.0 | 2.5 | 3.5 | 1.0 |
| No. 23 | 1.5 | 2.0 | 2.5 | 3.5 | 3.0 | 1.0 |
| No. 24 | 1.5 | 2.0 | 2.5 | 3.0 | 3.5 | 1.0 |

For example, the case where there are three peaks of the refractive indexes higher than those of a substrate and an anti-reflection structure as shown in Table 1 (a) is considered. It is assumed that the refractive index of a substrate (Sub in Table 1 (a)) is 1.5; the refractive index of a periodic fine structure as an anti-reflection structure (SWS in Table 1 (a)) is 1.0; three peaks (n1-3 in Table 1 (a)) are 2.0, 2.5 and 3.0, respectively; the refractive index of the interface of the gradient index thin film is the same as the substrate or the anti-reflection structure adjacent to the gradient refractive index thin film. In such case, the film thickness can be minimized by arranging them as Nos. 1, 3, 5 and 6 in Table 1 to obtain a profile with only one peak such that the line linking the refractive index peaks from the substrate side to the anti-reflection structure side changes from a monotonous increase to a monotonous decrease. On the contrary, if they are arranged as Nos. 2 and 4, the maximum film thickness becomes necessary.

The monotonous increase means, here, that the adjacent refractive index peaks increase one after another in the direction from the substrate side toward the anti-reflection structure side without decrease. The monotonous decrease means that the adjacent refractive index peaks decrease one after another in the direction from the substrate side toward the anti-reflection structure side without increase. When the film thickness direction is the horizontal axis and the refractive index is the vertical axis, a curve linking all refractive index peaks has a convex shape in the upper direction with the peak of the maximum refractive index of the refractive index peaks as the top of the convex shape. The film thickness of the gradient refractive index thin film can be minimized by providing a gradient refractive index property to the gradient refractive index thin film so as to comprise the plural refractive index peaks with the monotonous increase and the monotonous decrease as described above. In such case, the relation of the refractive index of the substrate, the refractive indexes of the local maximum values corresponding to the plural regions with slope change and the refractive index of the anti-reflection structure are defined as the change from the monotonous increase to the monotonous decrease from the substrate side to the anti-reflection structure side.

FIG. 1 (b) shows the case where four refractive index peaks (in FIG. 1 (b), n1-4) are 2.0, 2.5, 3.0 and 3.5, respectively, in the similar assumption of FIG. 1 (a). In FIG. 1 (b), the film thickness can be minimized by arrangement of Nos. 1, 7, 13, 15, 19, 21, 23 and 24. On the contrary, the maximum film thickness is necessary by the arrangement of Nos. 4, 5, 6, 10, 11, 12, 14 and 16.

Based on the assumption that the refractive index differences of the interfaces of the gradient refractive index thin film are small by arranging the refractive index peaks as described above, reflection in the total body including the interface within the gradient refractive index thin film depends on the refractive index change in a film thickness unit. Therefore, reflections are almost the same by making the changes constantly. Therefore, the film thickness can be controlled to make constant reflectance and the film thickness can be reduced to the minimum when the same reflectance is realized.

Likewise in the case where four or more high refractive index regions are necessary, the line linking the refractive index peaks can comprise a change from monotonous increase to monotonous decrease. When there are two refractive index peaks, the refractive index peak on the substrate side can be greater than the refractive index peak on the anti-reflection structure side and the refractive index peak on the anti-reflection structure side is greater than that of the anti-reflection structure. The film thickness can be minimized by arranging them so as to have a profile such that there is only one top of the curve linking the refractive index peaks.

The structure of an optical filter according to the present invention can be applied to various optical filters of an absorption type such as ND filters and color filters with problems to solved for a desired transmittance property such as flatness of the transmitted light.

A merit to widen the degree of freedom for the design can be obtained by increasing the number of the high refractive index regions. On the other hand, there are demerits such as disadvantage in a viewpoint of cost by increase of the film thickness and the refractive index changes; complication of control; and wrap of the substrate caused by stress, when a resin film is used as the substrate. Therefore, in the case where such structure is used for a ND filter, preferable numbers of the peaks are generally 4, or less than 4, and the more preferable numbers are 3, or less than 3. The relation of the refractive index of the substrate, the refractive indexes of the plural peaks in the refractive index change in the light-absorbing gradient refractive index thin film and the refractive index of the anti-reflection structure are provided so as to comprise monotonous increase and monotonous decrease from the substrate side toward the anti-reflection structure side, in order to reduce the film thickness as well as to obtain anti-reflection effect and light absorption of the gradient refractive index thin film.

Hereinafter, the optical filter according to the present invention will be described based on the examples when the optical filter is an ND filter.

EXAMPLES

Example 1

Figure 2:
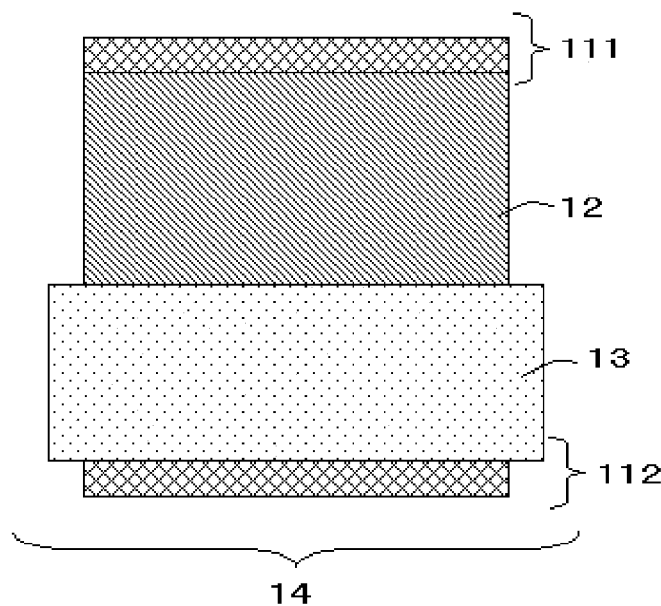
FIG. 2 is a structural drawing of an optical filter fabricated in Example 1.

An absorption-type ND filter formed as illustrated in FIG. 2 will be described in detail as follows. The refractive indexes for use in the following examples are identified as a refractive index of light with a wavelength of 540 nm from the materials of the substrate, the gradient refractive index thin film, and the anti-reflection structure.

(ND Filter)

A ND filter is used, with respect to further high sensitivity, high resolution of the recent solid-state imaging element, as a way to solve a hunting phenomenon and a diffraction phenomenon of a diaphragm of an imaging device. There is an increasing possibility that a captured image has a problem, such as ghost and flare caused by reflection of the filter itself, also in a ND filter obtained by forming a multi-layer film on a substrate by a vacuum film forming method. There is one of the big challenges to further reduce spectral reflectance in the visible light wavelength region in comparison with that of the prior art techniques.

As illustrated in FIG. 2, in the present example, a gradient refractive index thin film 12 was arranged on one surface side of a substrate 13 and an anti-reflection structure 111 was arranged on the gradient refractive index thin film 12. An anti-reflection structure 112 was arranged also on the back side of the substrate 13. The gradient refractive index thin film 12 comprises at least a part having absorption.

In a case of the structure as illustrated in FIG. 2, the reflection on the opposite surface of the substrate will increase, and, thus, the opposite surface may often require some kind of anti-reflection structure 112. As illustrated in FIGS. 3(a) to (d), examples of such anti-reflection structures 111 and 112 include fine periodic structures 151 and 152 having anti-reflection effects and anti-reflection films 161 and 162 formed of a thin film of a single layer or a plurality of layers, as well as a structure of the combination of the fine periodic structure 15 and the anti-reflection film 16. Any optimal structures may be appropriately selected. Such structures can markedly suppress occurrence of ghost light due to filter reflection, for example, no matter which surface of the filter is oriented to the imaging element side, and, thus, the filter can be arranged in the optical system regardless of the direction of the filter.

Figure 3:
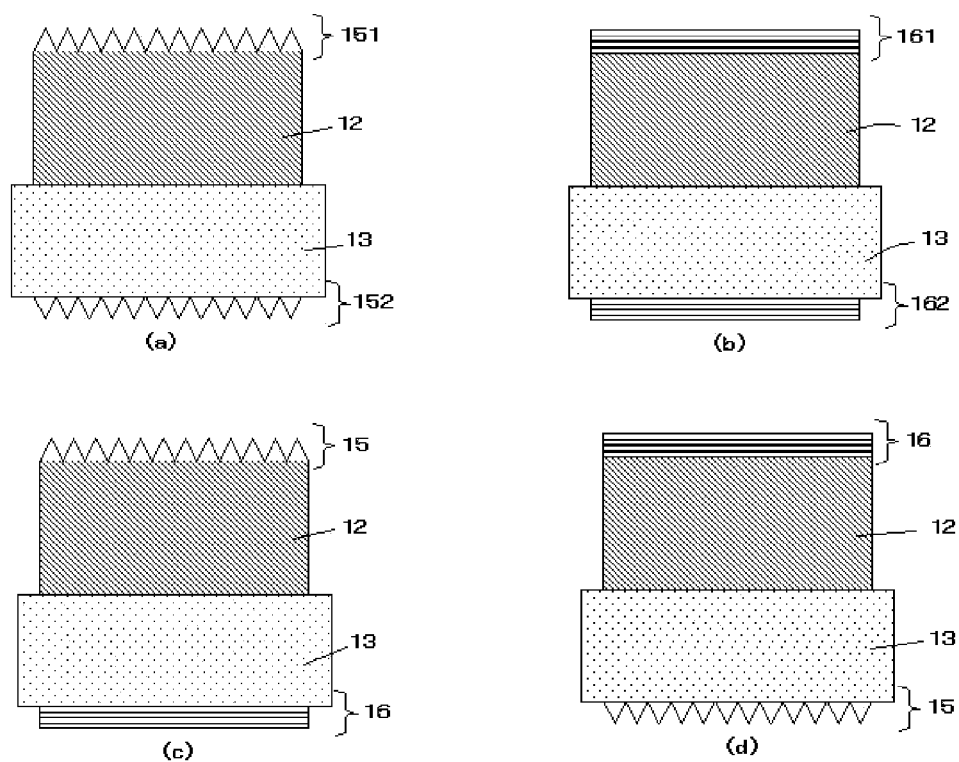
FIG. 3 illustrates structural examples of the optical filter described in Example 1.

Regarding FIGS. 3 (a) to (d), the structure as illustrated in FIG. 3(a) is more preferable from the point of view of reduction in reflection. Thus, in the present example, the fine periodic structures 151 and 152 were formed on each surface of the substrate 13 as the anti-reflection structure as illustrated in FIG. 3(a).

A function providing the same effect as that of the anti-reflection films 161 and 162, which is formed as a multi-layer film as illustrated in FIG. 3(b), can be incorporated, for example, into the gradient refractive index thin film 12. In this case, a refractive index profile is required for preventing reflection at an interface with the outside air by increasing and decreasing the refractive index a plurality of times in a periodic and continuous manner in a predetermined region near the interface of the surface layer. Thus, the structure can be considered to separately provide an anti-reflection structure on the gradient refractive index thin film. When the anti-reflection film is fabricated, materials different from the materials used to fabricate the gradient refractive index thin film can be used to fabricate the anti-reflection film on the gradient refractive index thin film so as to change the refractive index in a periodic and continuous manner.

A 0.1 mm-thick PET film was used for the substrate 13 for forming the ND filter 14 as one example of an absorption-type optical filter. In the present example, a PET film was used, but without being limited to this, a glass-based material may be used, or PO- or PI-based, PEN-, PES-, PC-, PMMA-based resin or TAO materials may also be used.

<Regarding Gradient Refractive Index Thin Film>

The gradient refractive index thin film 12 was adjusted and fabricated by adjusting the film formation rate of $SiO_2$ and TiOx by meta-mode sputtering to combine these two materials, and continuously changing the refractive index in the film thickness direction so as to obtain desired absorbing characteristics. When the adhesion between the substrate and the thin film become an issue, an adhesion layer formed by a material such as a surfactant can be inserted. It is necessary to take care of the refractive index differences to the materials adjacent the adhesion layer.

An example of the gradient refractive index thin film having such a continuous refractive index profile is illustrated in FIG. 1. In FIG. 1, from the substrate having a relatively high refractive index, the gradient refractive index thin film, and the fine periodic structure are laminated in this order. The refractive index changes so as to continuously increase or decrease the refractive index from the substrate side in the film thickness direction, and so as to be close to the refractive index of each adjacent structure as approaching an interface of both ends of the gradient refractive index thin film.

Figure 4:
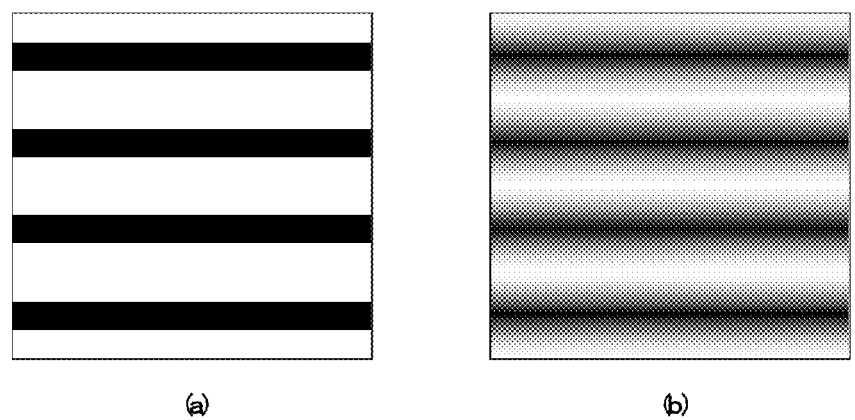
FIG. 4 illustrates electron micrographs of the multi-layer films and the gradient refractive index thin film.

The gradient refractive index thin film is a thin film where the refractive index changes continuously, preferably continuously and periodically, in a direction perpendicular to the film surface, namely, in the film thickness direction. The film having the continuous and periodical refractive index changes in the film thickness direction can be called a rugate film, or a rugate filter, as widely known in general. FIG. 4 illustrates a schematic view of electron micrographs of a multi-layer film and the gradient refractive index thin film. FIG. 4 (a) is a schematic cross-sectional view in the film thickness direction of the multi-layer film, and FIG. 4 (b) is a schematic cross-sectional view in the film thickness direction of the gradient refractive index thin film. For example, it is assumed that the dark-colored portions are $SiO_2$ portions and the light-colored (white) portions are $TiO_2$ portions, the multi-layer film is such that the film interface is clearly divided, while the gradient refractive index thin film is, unlike the multi-layer film, such that the film interface is not clearly divided. In addition, contrast is strong in the portions having a large refractive index change of the gradient refractive index thin film.

A plot of the results obtained by a depth direction analysis with density (strength) on the vertical axis and depth (parameter corresponding to the film thickness) on the horizontal axis is called a depth profile.

The depth direction analysis for studying composition distribution from the surface of a test sample to the inner side thereof often involves a method of analyzing by scraping the surface using accelerated ions for analysis in micron order or less. This method is referred to as ion sputtering, which is known as X-ray photoelectron spectroscopy (XPS) or Auger electron spectroscopy (AES or ESCA).

Thus, it is possible to confirm whether the desired refractive index distribution is obtained by evaluating the composition change in the film thickness direction of the gradient refractive index thin film to obtain a depth profile.

Various methods have been studied for designing such a gradient refractive index thin film. It has been found that even a step-type refractive index distribution with the refractive index changing stepwise and gradually, which is different from the continuous change, can obtain substantially the same optical characteristics as the film having continuously changing index by adjusting the refractive index distribution. However, for reduction in reflection, continuous refractive index change can provide more ideal characteristics, which can further eliminate an interface with the thin film, and the front and rear film compositions are very close to each other, thus exhibiting increase in film adhesion strength and improvement in environmental stability. From this point of view, it is better to select the refractive index distribution where the refractive index continuously changes.

Figure 5:
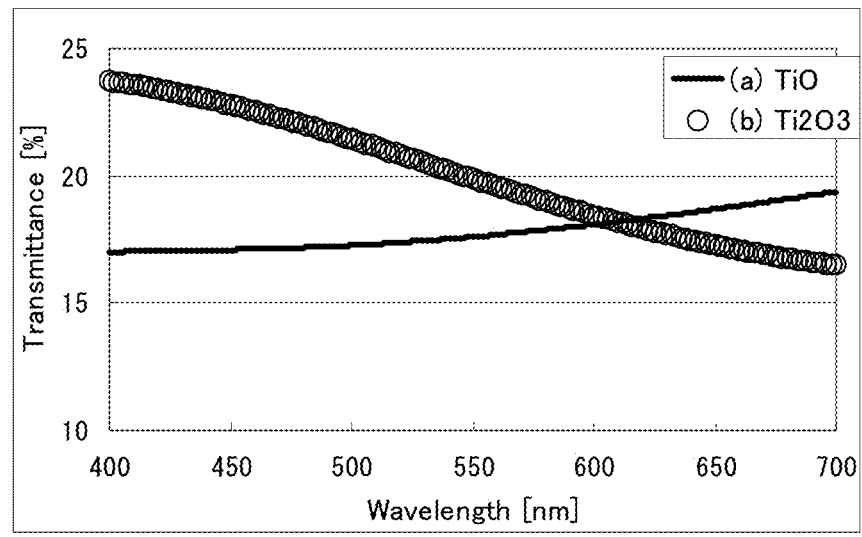
FIG. 5 illustrates an example of spectral transmittance characteristics of TiO and $Ti_2O_3$ described in Example 1.

As an example of a spectral transmission of a TiOx film, in the case of TiOx with "x" equivalent to 1, as illustrated by line (b) in FIG. 5, the spectral transmission characteristic in the visible wavelength region tend to gradually increase as approaching the long wavelength side. In the case of $Ti_2O_3$ with "x" equivalent to 1.5, as illustrated by line (a) in FIG. 5, the spectral transmission characteristic in the visible wavelength region tend to gradually decrease as approaching the long wavelength side. In light of this, as described above, the spectral transmission characteristics were adjusted to be flat as a whole by providing one or more combinations of arranging regions having an opposite dispersion shape in the film thickness direction of the gradient refractive index thin film 12. In the case of a metal oxide used in a conventional optical thin film, a similar tendency is observed, when the ratio of the metal and oxygen changes. The film design can be performed so as to improve flatness using such characteristics of the metal oxides. When the value of "x" is made variable, the refractive index is also changed. In light of this, it is necessary to determine the film formation ratio together with $SiO_2$ and to control the film formation based on the thus previously obtained basic data. The specific means of making the value of "x" variable in the film thickness direction can include controlling by adjusting the power of an oxidation source or adjusting the amount of gas to be introduced depending on the film forming method.

For example, two kinds of materials can be simultaneously electrically discharged in sputtering. A refractive index intermediate material having an intermediate refractive index between those of two materials can be fabricated by changing an electric discharge power of each material, namely, an input power to the targets and changing the mixture ratio thereof. Two or more kinds of materials may be mixed.

In the case of such sputtering, when one of the materials is low power, the electric discharge may be unstable. In the case of meta-mode sputtering, problems such as a reaction mode occur. Thus, in order to achieve all refractive indexes between these two materials, it is necessary to control the film thickness in parallel by adjusting elements other than the input power, for example, by controlling the deposition amount by means of the mask method.

<Sputtering Apparatus Structure>

Figure 6:
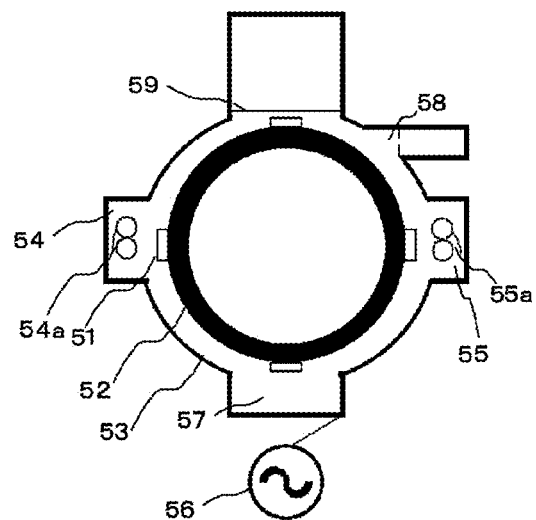
FIG. 6 is a schematic plan view of a sputtering apparatus for carrying out the present invention.

FIG. 6 is a cross-sectional plan view captured along the surface perpendicular to the rotating shaft of a substrate transfer apparatus of a sputter deposition apparatus used to fabricate the gradient refractive index thin film in the present example.

A sputter deposition apparatus comprises a rotatable cylindrical substrate transfer apparatus 52 holding a substrate 51, on which a thin film is to be formed, the substrate transfer apparatus 52 being provided inside a vacuum chamber 53; two sputter regions 54 and 55 provided in an annular space between an outer peripheral portion of the substrate transfer apparatus 52 and the vacuum chamber 53 outside thereof; and a reaction region 57. The substrate is loaded from a region 59.

The substrate 51 was placed on the substrate transfer apparatus 52 so that the surface on which a film was to be formed was oriented outside. The sputter regions 54 and 55 include AC double (dual) cathode-type targets 54a and 55a. A high-frequency power source 56 is arranged outside the vacuum chamber 53. The shape of a target material is not limited to be of a flat type, but may be of a cylindrical type. In addition to the above, for example, the region 58 may separately include an ion gun grid by high-frequency excitation having a grid electrode, or a neutralizer that releases low-energy electrons to neutralize positive ions to prevent the positive ion charge accumulation on the substrate. The sputtering apparatus for use in the present invention may include, for example, three or more sputter regions and may be implemented by any apparatus structures other than the above apparatus.

In the present example, using the sputtering apparatus illustrated in FIG. 6, the gradient refractive index thin film was formed in the form, in which a Si target was arranged in the sputter region 54; a Ti target was arranged in the sputter region 55; and oxygen was introduced in the reaction region 57. The substrate 51 fixed to the substrate transfer apparatus 52 was rotated at high speeds; Si and Ti ultra-thin films were formed on the substrate 51 in the sputter regions 54 and 55; and then the Si and Ti ultra-thin films were oxidized in the reaction region 57. Thus, the Si and Ti oxide films were formed. A mixed film of the Si oxide film and the Ti oxide film was fabricated by repeating the above process. Further, the gradient refractive index thin film having a continuous refractive index change in its film thickness direction was formed by continuously changing the sputter rate and the oxidation rate in each sputter region during film formation. A mixed film equivalent to $SiO_2$ and TiOx can also be fabricated by controlling the sputter rate and the oxidation rate of Si and Ti respectively based on film formation conditions independently for each of $SiO_2$ and TiOx. In a case in which the refractive index is continuously changed from the refractive index of the $SiO_2$ film alone to the refractive index of the TiOx film alone, when the input power is lowered, the electric discharge may be unstable. Thus, the input power was controlled and a masking system placed on a cathode was used during oxidation rate control.

An example of a refractive index profile of such a gradient refractive index thin film is illustrated in FIG. 1. In FIG. 1, from the substrate having a relatively high refractive index, the gradient refractive index thin film and the fine structure are laminated in this order. The refractive index has change (changing point of refractive index) so as to continuously increase or decrease the refractive index from the substrate side in the film thickness direction and so as to be close to the refractive index of each adjacent structure as approaching each interface of both ends of the gradient refractive index thin film.

As noted above, in the meta-mode sputtering method, the refractive indexes were changed within a range in which the electric discharge can be stably maintained and controlled. It is possible not only to continuously change the refractive indexes in the film thickness direction but also to change "x" of TiOx in the film thickness direction and, further to change extinction coefficients as well. Thus, the structure according to the present embodiment can continuously change the refractive indexes and the extinction coefficients by continuously changing the composition ratio of the three kinds of elements: Ti, Si, and O in the film thickness direction of the gradient refractive index thin film. Even in cases where other materials are used and the number of kinds of materials to form the gradient refractive index thin film is increased, the same adjustment can be performed. The composition can be continuously changed by continuously changing the thin film density.

Figure 7:
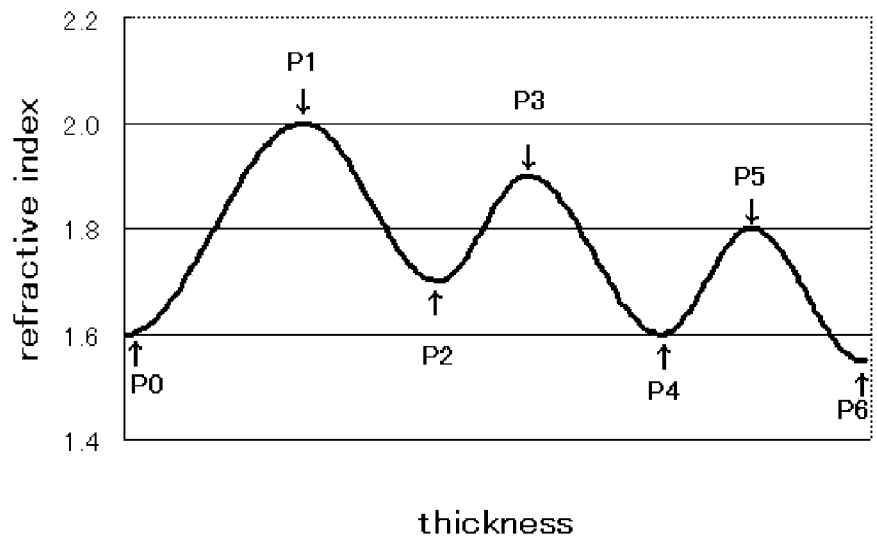
FIG. 7 illustrates a refractive index profile of the gradient refractive index thin film described in Example 1. A substrate is placed on the left side, and an anti-reflection structure is placed on the right side.
Figure 8:
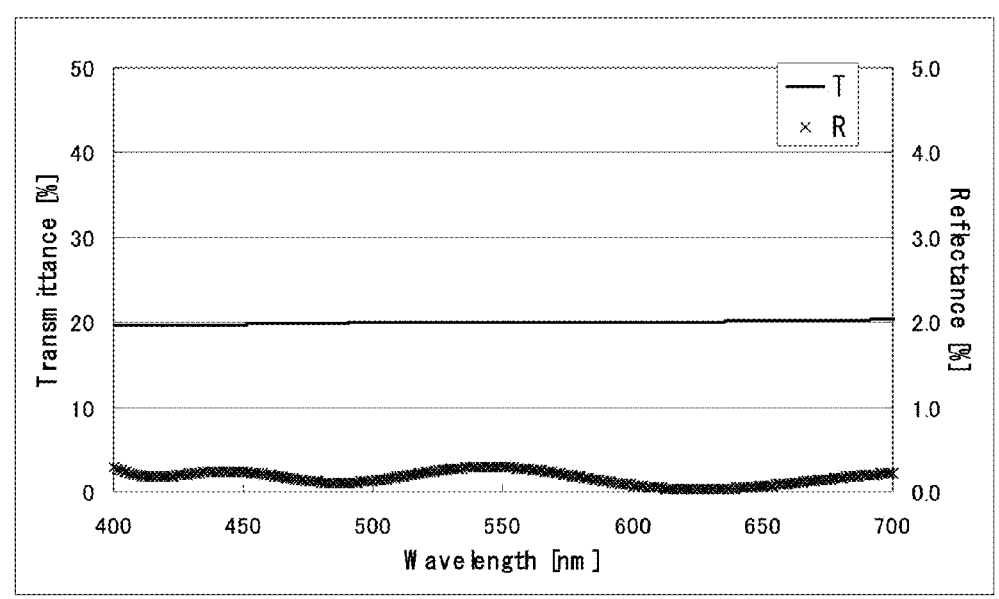
FIG. 8 illustrates a spectral reflectance characteristic of the optical filter fabricated in Example 1.

In the present example, the gradient refractive index thin film 12 was designed so as to have the refractive index profile as shown in FIG. 7. In FIG. 8, it was designed such that the structure was not complicated regarding easy control. In the refractive index profile of FIG. 7, X of TiOx is fixed to about 1.5 from interface point PO on the substrate side to point P2, and a continuous refractive index change was formed by changing the composition ratio with $SiO_2$.

Then, passing from point P2 thought point P3, and coming close to point P4, X of TiOx was continuously changed from 1.5 to 1.0. At the same time, the composition ratio with $SiO_2$ was changed; as approaching from point P2 to point P3, the composition ratio of TiOx to $SiO_2$ was increased, and further as approaching from point P3 to point P4, the composition ratio of TiOx to $SiO_2$ was decreased, thereby forming a continuous refractive index change. The composition ratio of TiOx to $SiO_2$ was increased, as approaching from point P4 to point P5, and, further, the composition ratio of TiOx to $SiO_2$ was decreased, as approaching from point P5 to point P6, In addition, X of TiOx is fixed to about 1.5 from point P4 to interface point P6 on the anti-reflection structure side, and a continuous refractive index change was formed by changing the composition ratio with $SiO_2$.

The vicinity of point P1 indicates the spectral transmission significantly affected by $Ti_2O_3$ and the vicinity of point P5 indicates the spectral transmission significantly affected by the TiO. Thus, in such a structure, the regions having different dispersion characteristics as illustrated in FIG. 5 in the visible wavelength region are mixed in the gradient refractive index thin film, and desired transmission characteristics can be obtained by adjusting the degree of influence by the film thickness and the composition ratio. In the present example, these were adjusted so that the spectral transmission characteristics were flat-shaped in the visible wavelength region.

The end point of the gradient refractive index thin film 12 was formed by $SiO_2$, from the point of view of anti-reflection and environmental stability to provide it the absorption as shown in FIG. 8. Thus, the refractive index at the end point of the gradient refractive index thin film 12 was about 1.47.

By doing so, a region exhibiting a spectral transmission strongly affected by TiO and a region exhibiting a spectral transmission strongly affected by $Ti_2O_3$ were configured in the gradient refractive index thin film. As a result, the regions having different dispersion characteristics as illustrated in FIG. 5 were mixed in the visible wavelength region, thereby enabling desired transmission characteristics to be obtained. Since the gradient refractive thin film has the regions or the changing points changing to the different dispersion characteristics such that X of TiOx changes from 1.5 to 1.0, the spectral transmission characteristics can approach a flatness.

A refractive index difference can easily occur in the interface of the substrate and the anti-reflection structure. The film was designed in the regions near the substrate and the fine structure so as to have mild refractive index changes in the viewpoint of anti-reflection. It is preferable to design so as to generate no refractive index differences as much as possible as shown in the concept drawing in the viewpoint of anti-reflection of FIG. 1. However, regarding the absorption optical filter in the present example, a region having a high-refractive index is necessary to obtain a desired absorption. Therefore, the refractive index of the gradient refractive index thin film preferably, mildly increases from the side near the substrate and approaches to the refractive index of the anti-reflection structure toward the fine structure through a slope changing region (inflection point) including a changing point.

In the present example, the gradient refractive thin film 12 was formed so as to have the refractive index profile as shown in FIG. 7 to satisfy the above requirements. The gradient refractive thin film had three different refractive index peaks and the refractive index of the interface on the substrate side of the gradient refractive thin film was about 1.6 and that on the anti-reflection structure side was 1.5. As the refractive index peaks shown in FIG. 7, in the case of the ND filter of the present embodiment requiring absorption, since the refractive index in the region with high absorption becomes fundamentally high, it is designed so that at least one peak has the refractive index more than 1.8.

The refractive index of the gradient refractive thin film mildly increased from the side near the substrate and turned to mild decrease after the local maximum value. Then, the refractive index turned to increase after going through the local minimum value. After such increase and decrease was repeated several times, a structure was designed such that the refractive index mildly approached to that of the anti-reflection structure finally toward the anti-reflection structure. Regarding the refractive index of the substrate is greater than that of the end portion of the anti-reflection structure, a refractive index change for reducing reflection can be easily obtained, when the refractive index of the local maximum value nearest the substrate of the plural local maximum values is the global maximum of the refractive index change of the gradient refractive thin film.

Three refractive maximum values in the gradient refractive thin film were placed as shown in FIG. 7. Their arrangement is not limited. It is preferable to prepare a monotonous increase turning to a monotonous decrease from the substrate toward the anti-reflection structure such that a curve linking the maximum values has a peak. As a result, the film thickness can be minimized.

Reflection occurs based on the refractive index differences also at the interface of the substrate and the gradient refractive thin film and the interface of the gradient refractive thin film and the fine periodic structure, if their refractive indexes are different. Thus, when reflection by these interfaces become a problem, it is preferable to reduce the refractive index differences as possible. In the present example, the refractive index differences of these two interfaces was controlled to 0.05 or less than 0.05, respectively, by controlling the rate ratio of $SiO_2$ and $TiO_x$ just after the starting of the film forming and just before the ending of the film forming. The film thickness of the gradient refractive thin film 12 was controlled to about 400 nm. When the film thickness of the gradient refractive thin film is smaller, the changing rate of the refractive index from the substrate to the anti-reflection structure becomes steeper. Therefore, the film thickness is preferably greater in the viewpoint of anti-reflection.

<Regarding Anti-Reflection Structure>

After the fabrication of the gradient refractive index thin film 12, fine periodic structures 151 and 152 were formed on the gradient refractive index thin film 12 as the anti-reflection structure with a sub-micron pitch having anti-reflection effect by the optical nanoimprint method using a UV curable resin as described above.

With recent advancement in microfabrication technique, fine periodic structures have been fabricated. The fine periodic structure having an anti-reflection effect as one of such structures can generally be called a Moth-Eye structure. The structure was shaped such that the refractive indices were continuously changed in a pseudo manner, thereby reducing reflection due to a refractive index difference between materials.

Various methods have been proposed for fabricating such a fine periodic structure, but the present example used an optical nanoimprint method using a UV curable resin.

The fine periodic structure was designed to be shaped in a pillar array with periodically arranged cones, considering the applications as a ND filter, having a height of 350 nm and a period 250 nm so as to be a structure enabling reduction in reflectance of at least the visible wavelength region. Further, regarding the matrix-shaped array of protruding structures, there can be considered a square array and a three-way (hexagonal) array. The three-way array is said to have a higher anti-reflection effect because of less exposed surface of the substrate material. Accordingly, the present example used the three-way pillar array.

An appropriate amount of UV curable resin was dropped on a quartz substrate as a mold having a hole array shape obtained by inverting the previously designed shape. Then, the resin was cured by emitting UV light to the substrate subjected to imprinting in a state of pressing the quartz mold thereto, thereby fabricating sub-micron pitch pillar array shaped fine periodic structures 151 and 152. Although various UV curable resins can be used, here PAK-01-CL (trade name) fabricated by Toyo Gosei Co., Ltd. was used.

Here, in order to increase adhesion between the gradient refractive index thin film and the fine periodic structure, primer treatment was performed to provide an adhesion layer between the gradient refractive index thin film and the fine periodic structure. As a primer solution, surfactant KBM-503 (trade name) fabricated by Shin-Etsu Chemical Co., Ltd., was used as a base, to which an appropriate amount of IPA (isopropyl alcohol) and nitric acid was added, and then an adjustment was made so that the adhesion layer cured after coating had a refractive index of 1.45. The solution was dropped on the gradient refractive index thin film through a 0.2 μm-PTFE (polytetrafluoroethylene) filter, and was coated so as to form an ultra-thin film by spin coating. Thereafter, the adhesion layer was formed by drying treatment at 120° C. for 10 minutes. If there is a need to further strengthen the adhesion, TEOS (tetraethylorthosilicate) may be further added to the component of the aforementioned primer solution. In addition, in order to more uniformly coat the primer solution, before coating the primer solution, hydrophilic processing by UV ozone is more preferably performed on the substrate. Further, in order to coat both surfaces of the substrate, the density may be appropriately adjusted and coated by dip coating or after one side thereof may coated by spin coating, then the front and back of the substrate are reversed, and then the other side surface thereof may be coated again by spin coating. In the present example, the latter was selected. The refractive index difference between the adhesion layer and the adjacent structure is preferably 0.05 or less than 0.05.

In the case of a filter having absorption over an entire visible wavelength region like a ND filter, such filter has also absorption in the ultraviolet region also often has absorption. Therefore, depending on the wavelength of UV light to be used, when light is emitted from the substrate side of the filter, the ND filter absorbs at least part of the light, and thus sufficient light may not reach the resin. Thus, in that case, there is a need to emit UV light from the mold side and to select a mold of a material allowing the required wavelength of UV light to be sufficiently transmitted.

Further, considering the optical nanoimprint process, when one side surface of the substrate 13 is subjected to imprinting, and then the other side surface thereof is subjected to imprinting, it is assumed to result in damages such as cracking or chipping in the initially formed fine periodic structure. In light of this, there was selected a method of arranging imprint molds on each surface of the substrate, respectively, and simultaneously performing optical nanoimprint on both surfaces thereof. In this case, productivity can be increased by arranging two UV light sources for each surface of the substrate.

<Optical Filter Characteristics>

FIG. 8 illustrates the spectral reflectance characteristic and the spectral transmittance characteristic of the ND filter fabricated as described above. The density is about 0.70 and the reflectance in most of the visible wavelength region is 0.4% or less. The present structure achieved a very low reflectance. Spectrophotometer (U4100) fabricated by Hitachi High-Technologies Corporation was used for measurement.

Further, the spectral transmission characteristics is flat in the entire visible region. If flatness is defined as {(maximum value of transmittance at 400 to 700 nm)−(minimum value of transmittance at 400 to 700 nm)}$\sqrt[3]{}$/(average value of transmittance at 500 to 600 nm), which is one of the indices of flatness, the flatness of the filter fabricated by the present example was about 3.2%. The reflectance of the visible light region was reduced to a very low value of 0.5% or less and the ND filter excellent in flatness was obtained.

A higher density thin film can be stably formed by a sputtering method in comparison with a deposition method or other methods.

In the present example, oxides were used for controlling the refractive index, but nitrides may also be used, and various compounds may be used as long as the refractive index changes continuously and periodically as the gradient refractive index thin film.

Adhesion and durability can be improved by providing a buffer layer between the substrate and the gradient refractive index thin film and/or between the gradient refractive index thin film and the anti-reflection structure, wherein the refractive index of the buffer layer is close to each of the substrate and the anti-reflection structure. In this case, a design considering the buffer layer may be made.

Example 2

Figure 9:
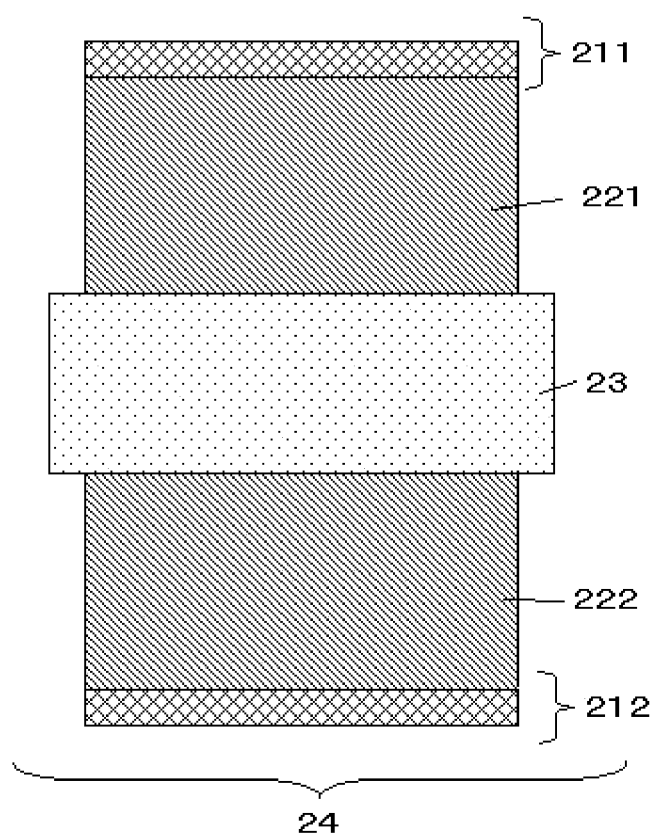
FIG. 9 is a structural drawing of an optical filter fabricated in Example 2.

There follows a description of fabrication of a filter forming gradient refractive index thin films on each surface of the substrate as illustrated in FIG. 9.

Figure 10:
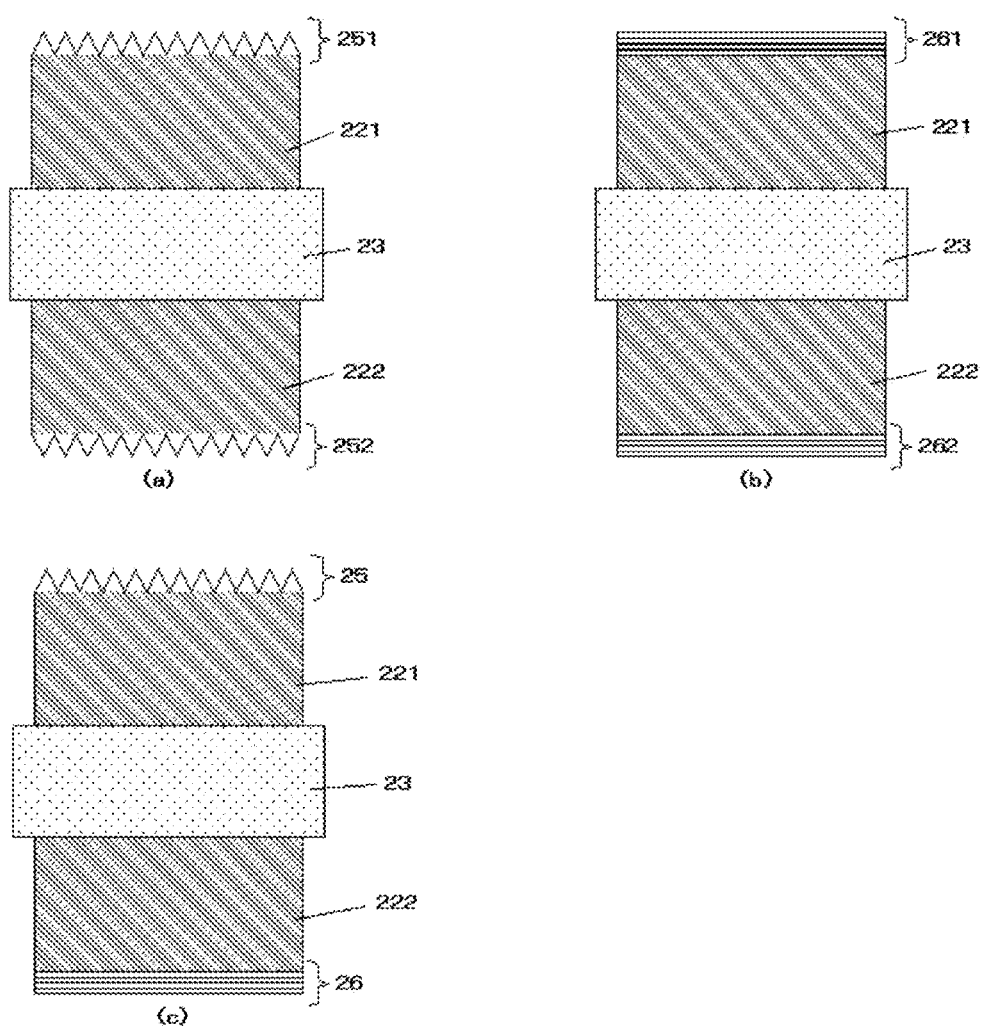
FIG. 10 illustrates structural examples of the optical filter described in Example 2.

As illustrated in FIG. 9, in the present example, a gradient refractive index thin film 221 was arranged on one side surface of a substrate 23, and an anti-reflection structure 211 was arranged on the gradient refractive index thin film 221. Then, likewise, a gradient refractive index thin film 222 and an anti-reflection structure 212 were arranged on the back side surface of the substrate 23. A function having a desired absorption in a desired wavelength region of the ND filter 24 was provided to both gradient refractive index thin films 221 and 222. Under certain circumstances, only one or the other of the gradient refractive index thin films 221 and 222 can provide the similar characteristic. As illustrated in FIGS. 10 (a) to (c), examples of such anti-reflection structures 211 and 212 can include fine periodic structures 251 and 252 having an anti-reflection effect and anti-reflection films 261 and 262 formed by a thin film of a single layer or a plurality of layers. Further, the examples thereof can include a structure of combining a fine periodic structure 25 and an anti-reflection film 26. Any optimal structure may be appropriately selected.

In FIGS. 10 (a) to (c), the structure as illustrated in FIG. 10(a) is more preferable from the point of view of reduction in reflection. Thus, in the present example, as illustrated in FIG. 10(a), the fine periodic structures 251 and 252 were formed on each surface of the substrate 23 as the anti-reflection structure.

SFL-6 glass with a thickness of 1.0 mm was used for the substrate 23 for forming the ND filter 24. In the same manner as in Example 1, first the gradient refractive index thin film 221 was fabricated on one side of the substrate 23 by meta-mode sputtering while adjusting the film formation rate of the SiO$_2$ and TiOx films. In this case, adjustment was also made so as to obtain desired absorbing characteristics by mixing the two kinds of materials and continuously changing the refractive index in the film thickness direction. Thereafter, the front and back of the substrate were reversed, and then the gradient refractive index thin film 222 as a mixed film of SiO$_2$ and TiOx was fabricated again in the same manner. The film thickness of the gradient refractive index thin films 221 and 222 was adjusted to be about 200 nm.

A film design was made such that the absorbing characteristics of the gradient refractive index thin films 221 and 222 were adjusted by not only continuously changing the refractive index in the film thickness direction but also changing X of TiOx in the film thickness direction and changing the extinction coefficients as well as, such that the spectral transmission characteristics in the visible wavelength region of 400 nm to 700 nm was set to be flat characteristic with small dispersion as a whole film. Specifically, the gradient refractive index thin films 221 and 222 were configured to have a profile of the refractive index as illustrated in FIG. 11.

Figure 11:
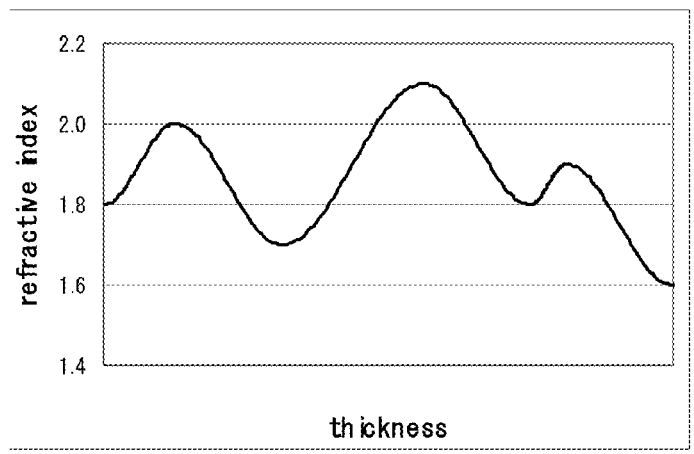
FIG. 11 illustrates a refractive index profile of the gradient refractive index thin film described in Example 2. A substrate is placed on the left side, and an anti-reflection structure is placed on the right side.

In the present example, the gradient refractive thin film was formed so as to have the refractive index profile as shown in FIG. 11 to satisfy the above requirements. The gradient refractive thin film had three different refractive index peaks and had the structure in which the refractive index of the interface on the substrate side of the gradient refractive thin film was about 1.8 and that on the anti-reflection structure side was about 1.6. The refractive index of the gradient refractive index thin film mildly increased from the near side to the substrate and turned to mild decrease through a maximum value. The refractive index turned, then, to increase from the minimum value. After such increase and decrease were repeated several times, a structure was designed such that the refractive index mildly approached to that of the anti-reflection structure finally toward the anti-reflection structure. Three refractive index maximum values were arranged as shown in FIG. 11, but their arrangement is not limited thereto.

Thereafter, the sub-micron pitch fine periodic structures 251 and 252 having anti-reflection effect were formed on the gradient refractive index thin films formed on both surfaces of the substrate by optical nanoimprint method using a UV curable resin. For the same reason as in Example 1, in the present example, the imprint molds were arranged on each surface of the substrate and optical nanoimprint was simultaneously performed on both surfaces of the substrate on which the ND film was formed.

Figure 12:
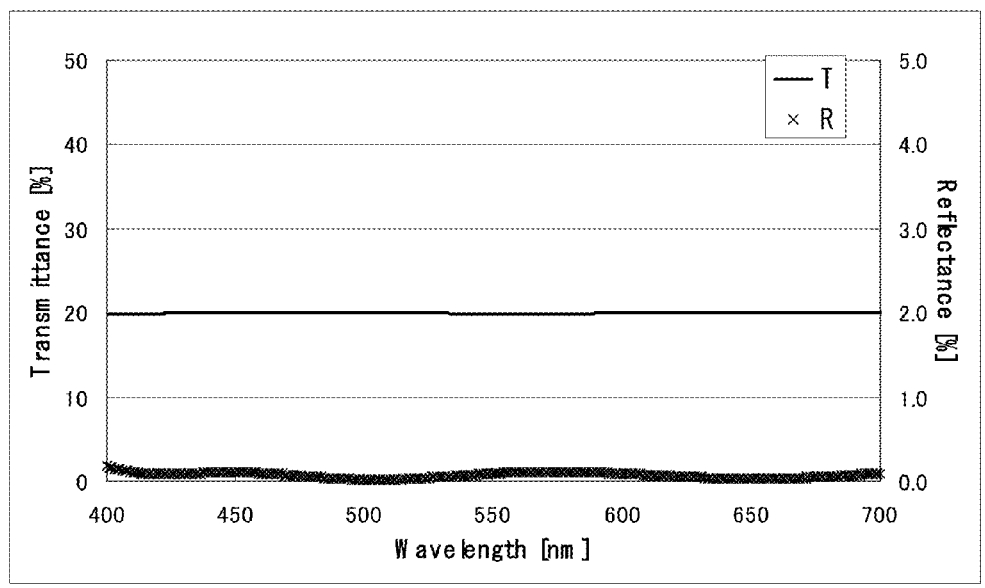
FIG. 12 illustrates a spectral reflectance characteristic of the optical filter fabricated in Example 2.

The spectral reflectance characteristics of the ND filter and the spectral transmittance characteristic fabricated as described above were illustrated in FIG. 12. The density was about 0.70 and the reflectance in the visible wavelength region was about 0.2% or less. The present structure achieved a very low reflectance. A spectrophotometer was used for measurement.

Further, the spectral transmission characteristic was flat over the entire visible region, and in terms of the above-described flatness index, the flatness of the filter fabricated by the present example was about 1.6%, the reflectance of the visible light region was reduced to a very low value of 0.5% or less, and the filter excellent in flatness was obtained.

Examples 3 and 4

Examples 3 and 4 according to the present invention relate to an optical filter having a gradient refractive thin film and an anti-reflection structure formed on a light-transmitting substrate in this order and an optical apparatus and an electronic devise using the optical filter.

JP 2009-122216A discloses a ND (Neutral Density) filter having a fine periodic structure as an anti-reflection structure. WO 2010/150615 discloses reduction of reflection by a structure in which a color filter layer is formed on a Moth-Eye film and the refractive index approaches with a pseudo manner toward the refractive index of the substrate in the film thickness direction.

Regarding the structure as describe in JP 2009-122216A in which the fine periodic structure is formed on the substrate and a light-absorbing film absorbing light in the visible wavelength region is formed on the part of the anti-reflection structure, there is a case where light reflection at these interfaces becomes a problem. An optical filter having a gradient refractive index thin film in which the refractive index approaches toward the refractive index of the substrate in the film thickness direction has been proposed as described in WO 2010/150615. On the other hand, when a thin film is formed on a substrate, which has a gradient of the refractive index by using a region with change of the mixing ratio of different materials in the film thickness direction, the composition of the different materials is unstable in comparison with a region with a constant composition, not only in a continuous refractive change type but also in a stepwise refractive change type in many cases.

An object of Examples 3 and 4 is to improve environment resistance of an optical filter with a fine structure and a gradient refractive index thin film, which reduce defects caused by reflectance. Another object is to provide an optical apparatus to markedly reduce ghost caused by reflectance and also realize environment resistance by using the optical filter in an optical system of an imaging apparatus.

According to Examples 3 and 4 of the present invention, an optical filter with excellent environment resistance to markedly reduce reflection can be obtained. Regarding an imaging apparatus using such optical filter in an optical quantity diaphragm device, a apparatus stable in the environment and enabling high image quality can be obtained.

The optical filter according to Examples 3 and 4 comprises a light-transmitting substrate, a gradient refractive index thin film formed on the substrate and a multi-function film formed on the gradient refractive index thin film and a fine structure comprising many fine structures at a pitch shorter than wavelength of visible light. In particular, according to the present invention, an optical filter with excellent environment resistance and markedly reduced reflection can be realized by forming the multi-function film as the base of the fine structure as described in detail below.

The gradient refractive index thin film is placed between the substrate and the fine structure in the film thickness direction. The gradient refractive index thin film has preferably a stepwise or continuous, and periodic refractive index change in the film thickness direction. The refractive index change comprises:

(I) a portion where, on the substrate side, the refractive index changes so as to be close to the refractive index of the substrate until the end point on the substrate side of the refractive index change; and (II) a portion where, on the anti-reflection structure side, the refractive index changes so as to be close to the refractive index of the anti-reflection structure until the end point on the anti-reflection structure side of the refractive index change.

In addition, the refractive index change may comprise:

(III) a changing point, at which plus or the minus of the slope of the refractive index change (the slope of a tangential line for a change as a curve) change, provides a refractive index change in which the refractive index approaches monotonously, i.e., without changing points from the plus to the minus of the slope of the refractive index change or without changing points form the minus to the plus of the slope of the refractive index change, toward at least one of the refractive indexes of the end point on the substrate side and the end point of the fine structure side. When the refractive index change of the gradient refractive index thin film is stepwise and the stepwise change is an increasing change, as the slope of the refractive index change, the slope of a line liking the starting point and the end point of the increasing section can be taken. When the stepwise change is a decreasing change, as the slope, the slope of a line liking the starting point and the end point of the decreasing section can be taken. When the refractive index change of the gradient refractive index thin film is stepwise, the refractive index change may have a refractive index change between the adjacent stepwise changing parts acceptable as a optical filter, and the stepwise refractive index change can be formed so as to comprises a part with a prescribed constant refractive index in the film thickness direction as the changing point wherein the plus or minus of the slope changes, i.e., the peak and the bottom can be formed by the part where the refractive index does not change in the film thickness direction.

Figure 13:
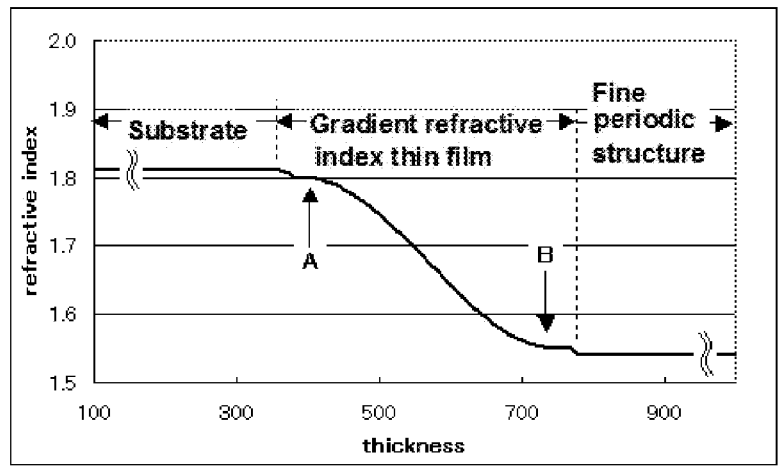
FIG. 13 illustrates examples of the refractive index profile of a gradient refractive index thin film according to the present invention.
Figure 13:
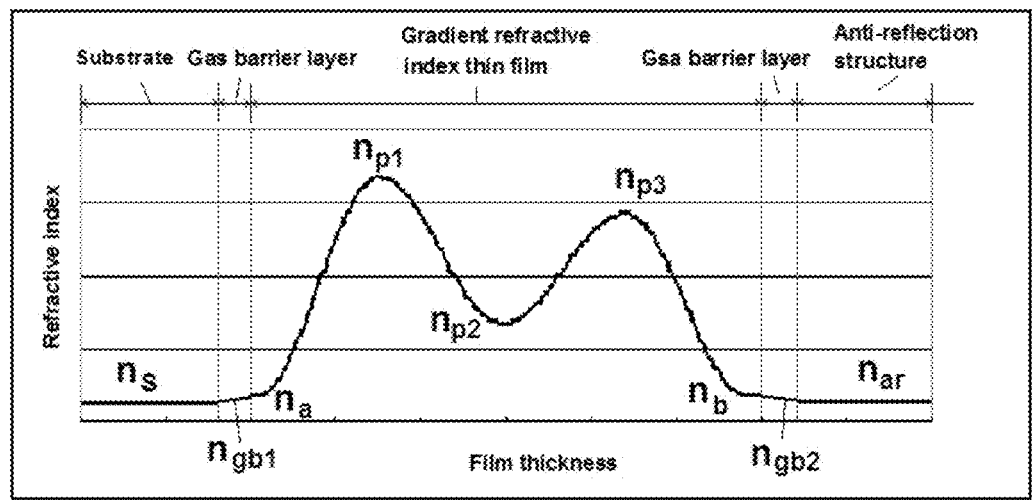

An example of the refractive index change in the film thickness direction from the substrate side to the fine structure (for example, a fine periodic structure) in an optical filter according to the present invention is shown in FIGS. 13 (A) and (B). The above end point on the substrate side of the refractive index change is indicated, for example, by point "A" in FIG. 13 (A), and the above end point on the fine structure side is indicated by point "B". In the example illustrated in FIG. 13 (A), regarding a terminal portion including end point (or start point) "A" on the substrate side of the refractive index distribution change, the refractive index of the gradient refractive index thin film changes so as to be close to the refractive index of the substrate, in the terminal portion including end point "A". Likewise, a terminal portion including end point (or start point) B on the fine structure side of the refractive index distribution change, in the terminal portion including end point B, the refractive index of the gradient refractive index thin film also changes so as to be close to the refractive index of the fine structure. In the refractive index profile in the film thickness direction as shown in FIG. 13 (A), no multi-function film is shown, but a multi-function film is formed at least on side of the substrate side and the fine structure side.

An example of the refractive index change in the film thickness direction is shown in FIG. 13 (B), when two multi-function films are formed on both the substrate side and the fine structure side, respectively.

Refractive indexes ngb1 and ngb2 of a multi-function film are defined in a range by the refractive indexes of the substrate, the gradient refractive index thin film and the fine structure. The refractive index differences of refractive indexes ngb1, ngb2 of the multi-function film to refractive index na of the adjacent end point on the substrate side and refractive index nb of the adjacent end point on the fine structure side, respectively, are smaller than the refractive index differences of refractive indexes np1, np3 of the changing points, at which the slope of the step wise or continuous refractive index change and refractive indexes ngb1, ngb2 of the multi-function film, respectively. Thus the following conditions are satisfied:

$$|ngb1-(np1 \text{ or } np3)|>|ngb1-na| \qquad (III)$$

$$|ngb2-(np1 \text{ or } np3)|>|ngb2-nb| \qquad (IV)$$

The condition of (III) indicates that the refractive index difference between the multi-function film formed on the substrate side and the end point of the refractive index change on the substrate side of the gradient refractive index thin film in the film thickness direction is smaller than the difference between the multi-function film formed on the substrate side and the changing points of the refractive index change of the gradient refractive index thin film.

The condition (IV) indicates that the refractive index difference between the multi-function film formed on the fine structure side and the end point of the refractive index change on the fine structure side of the gradient refractive index thin film in the film thickness direction is smaller than the difference between the multi-function film formed on the fine structure side and the changing points of the refractive index change of the gradient refractive index thin film.

The case where the multi-function films are formed on both substrate side and the fine structure side of the gradient refractive index thin film is explained based on FIG. 13 (B). A multi-function film can be formed only one side of the substrate side and the fine structure side of the gradient refractive index thin film. When the gradient refractive index thin film is formed only one side of the substrate side and the fine structure side in such way, the refractive index changes of the multi-function film and the gradient refractive index thin film are set under the conditions (III) and (IV) as explained regarding FIG. 13 (B).

Although the refractive index change in FIG. 13 (B) comprises three changing points as explained above, such refractive index change profile is not limited thereto. The conditions (III) and/or (IV) as described above are applied to a refractive index change profile comprising at least one changing point at which the slope of the refractive index changes from plus to minus.

When no multi-function film is formed on the substrate side or the fine structure side of the gradient refractive index thin film, the gradient refractive index thin film is placed preferably adjacent the substrate or the fine structure by using the refractive index relationship as shown in FIG. 13 (A). The refractive index differences of the multi-function film to the structures adjacent both sides of the multi-function film, respectively, are preferably 0.05 or less than 0.05.

Furthermore, refractive indexes ngb1, ngb2 of the multi-function film preferably comprise a refractive index profile in the film thickness direction so as to approach the refractive indexes of the adjacent substrate and the adjacent anti-reflection structure from refractive index na of the end point on the substrate side and refractive index nb of the end point on the fine structure side, respectively. Thus, when a multi-function film is formed on the substrate side, the refractive index of the multi-function film approaches the refractive index of the adjacent substrate from the refractive index of the end point on the substrate side of the refractive index change in the film thickness direction of the gradient refractive index thin film. When a multi-function film is formed on the fine structure side, the refractive index of the multi-function film approaches the refractive index of the adjacent fine structure from the refractive index of the end point on the fine structure side of the refractive index change in the film thickness direction of the gradient refractive index thin film. The refractive index of the multi-function film may have a constant refractive index or a refractive index change such that no interface(s) with refractive index difference(s) of 0.05 or more than 0.05. For example, the refractive index of the multi-function film may reach the refractive index of the substrate or the fine structure from the end point at the interface of the refractive index change in the gradient refractive index thin film, continuously or stepwise with the prescribed refractive index differences without changing point(s). The refractive index of the multi-function film may reach the refractive index of the substrate or the fine structure from the end point at the interface of the refractive index change in the gradient refractive index thin film, continuously or stepwise with the prescribed refractive index differences, with changing point(s). The refractive index is preferably constant or reaches the adjacent structure without changing point(s). As the preferable case, interface reflection can be reduced by reducing the refractive index differences to the adjacent structures in addition to environmental resistance, for example barrier effect, when the refractive indexes of the multi-function film is equivalent to the refractive indexes of both end points of the refractive index change of the gradient refractive index thin film or when the refractive index of the multi-function film is intermediate to the refractive indexes of the structures as the adjacent parts, i.e., ngb1 is an intermediate refractive index between na and ns, or ngb2 is an intermediate refractive index between nb and nar, respectively. In the multi-function film, its refractive index may change in a desired range, and it is preferable that its composition is stable and its refractive index is constant. These preferable embodiments can be applied also to the case where the gradient refractive thin film is formed only on side of the substrate side and the anti-reflection structure side.

When the refractive index change is stepwise, the refractive index change may be that in a range acceptable in an optical filter in the adjacent parts and a part, in which the refractive index in a desired film thickness is constant in the film thickness direction, can be formed, as the changing point(s) at which plus or minus of the slope changes, Point A shown in FIG. 13 (A) can be placed on the interface of the gradient refractive thin film on the substrate side. Point B can be placed on the interface of the gradient refractive thin film on the fine structure side.

Light reflection can be markedly reduced in an optical filter by arranging a substrate, a gradient refractive index thin film with continuous refractive index change in its film direction and a fine structure expressing anti-reflection effect in a desired light wavelength region in this order and by setting the relationship of the refractive indexes of the substrate, the gradient refractive index thin film and the fine structure as (i) and (ii) as described above.

The multi-function film comprises light transmittance characteristic, more concretely, and the multi-function film is placed adjacent the gradient refractive index thin film to obtain environmental resistance as an optical filter by reducing influence of water or oxygen form the substrate or anti-reflection structure side against the gradient refractive index thin film. Since the multi-function film has the function as an environmental resistant film as described above, desired functions of an optical filter can be realized by reducing reflection at the interface to the adjacent gradient refractive index thin film and the interface to the anti-reflection structure and/or the substrate, while a desired environmental resistance can be provided to the gradient refractive index thin film.

As the constituent materials of such multi-function film, oxides including at least one of Al and Si can be used. Oxides including Al and Si are preferable. For example, $SiO_x$ (x=about 1.5-about 2.0) and $SiAl_xO_y$ are mentioned and it is preferable that the film can be formed such that its composition is almost constant in the film thickness direction. Alternatively, the multi-function film can comprise a composition different from that of the gradient refractive thin film.

The refractive index of the multi-function film can be the same as that of the gradient refractive index thin film adjacent the multi-function film, or their refractive index difference can be set in a range acceptable for a desired optical filter.

For example, when a multi-function film is formed on the fine structure side of a gradient refractive thin film, the refractive index of the multi-function film is set preferably as the same as that of the interface region of the gradient refractive index thin film adjacent the multi-function film, or their refractive index difference is preferably 0.05 or less than 0.05. The refractive index of the multi-function film is set preferably as the same as that of the fine structure adjacent the multi-function filter, or their refractive index difference is preferably 0.05 or less than 0.05.

When a multi-function film is formed adjacent the substrate side of a gradient refractive index thin film, the refractive index of the multi-function film is set preferably as the same as that of the interface region of the gradient refractive index thin film adjacent the multi-function film, or their refractive index difference is preferably 0.05 or less than 0.05. The refractive index of the multi-function film is set preferably as the same as that of the substrate adjacent the multi-function filter, or their refractive index difference is preferably 0.05 or less than 0.05.

The thickness of the multi-function film can be set so as to obtain a desired light transmittance characteristic and environmental resistance. A thicker film is better and, for example the film thickness can be at least 10 nm and preferably selected form the range of 10 nm to 100 nm.

The multi-function film can be formed by not only a single layer, but also multi-layers. For example, it can be formed as a two-layer multi-function film by forming a $SiO_2$ layer after an $Al_2O_3$ layer. In such case, it is preferable to reduce the refractive index difference at each interface of the layers forming the multi-function film as small as possible regarding reflection. Such refractive index difference(s) is preferably 0.05 or less than 0.05.

At least one of the regions with a constant material composition of a gradient refractive thin film as explained in the refractive index profile shown in FIG. 13 can be used as a multi-function film formed in a functional thickness. When such structure is adopted, the refractive index change between the gradient refractive index thin film and the multi-function film can be continuous by continuously forming form the multi-function film to the gradient refractive index thin film, or the gradient refractive index thin film to the multi-function film. When the gradient refractive index thin film comprises at least one of metals or metalloid elements according such continuous film forming method, the multi-function film can be formed by materials comprising at least one of the metal elements or metalloid elements included in the gradient refractive index thin film. When the gradient refractive index thin film comprises at least one oxide, the multi-function film can be formed by a saturated oxide of at least one oxide forming the gradient refractive index thin film. It is easy to improve the freedom for design, obtain environmental resistance and reduce reflection by forming the multi-function film by plural metals or metalloid elements.

The optical filter structures according to Examples 3 and 4 of the present invention can be applied to various optical filters.

Regarding the optical filters of Examples 3 and 4 according to the present invention, fabrication of a ND filter is explained below as a absorption film filter easily changing its characteristics according to influence of the atmosphere of an environment.

Example 3

Figure 14:
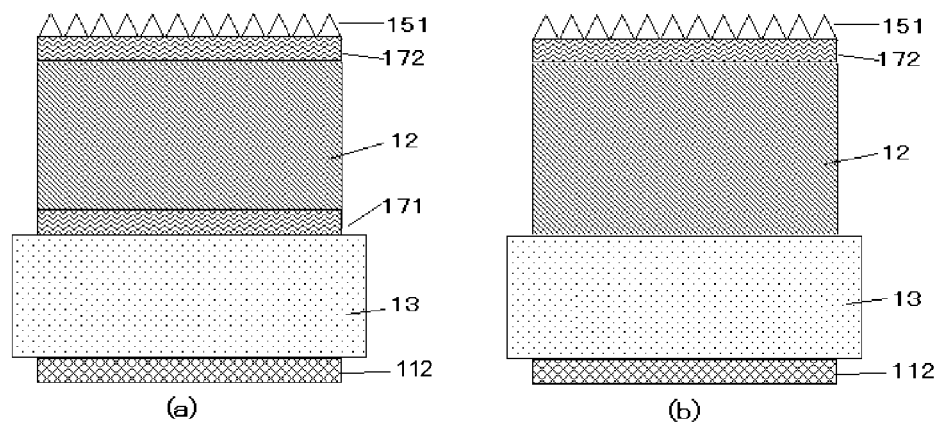
FIG. 14 illustrates structural examples of the optical filter described in Example 3.

An absorption-type ND filter as formed in FIG. 14 is described in detail below.

The refractive index in each example described below is identified as a refractive index of light with a wavelength of 540 nm from the constituent materials of the substrate, the gradient refractive index thin film, the multi-function film and the fine structure.

As shown in FIG. 14 (*a*), in the present example, after a multi-function film 171 as another multi-function film was formed on one surface of a substrate 13, a gradient refractive index thin film was placed thereon, and, further, a multi-function film 172 and a fine periodic structure 151 were formed on the gradient refractive index thin film in this order. An anti-reflection structure 112 was also formed on the back surface of the substrate 13. The optical filter functions as a ND filter by controlling the composition of the gradient refractive index thin film 12 so as to have absorption in the visible wavelength region.

In the case such a structure of FIG. 14 (*a*), since reflection on the opposite surface of the substrate becomes great, any anti-reflection structure 112 is necessary on this surface in many cases. Such anti-reflection structure 112 includes a fine periodic structure having anti-reflection effect, a anti-reflection film formed by a multi-layer thin film, and a combination of a fine periodic structure and an anti-reflection film. An optimum structure can be selected as desired.

When such structure is adopted, occurrence of ghost light due to filter reflection can be suppressed, for example, no matter which surface of the filter is oriented to the imaging element side, and thus the filter can be arranged in the optical system regardless of the direction of the filter.

In FIGS. 14 (*a*) and (*b*), the structure as shown in FIG. 14 (*a*) is more desirable in the viewpoint of reduction of reflection and protection against entry of water, oxygen from the substrate. In particular, when the substrate made of a resin is hygroscopic, entry of water, oxygen can be markedly reduced from the substrate side to the gradient refractive thin film. Therefore, in the present example, a multi-function film was placed on the substrate side and the fine structure side of the gradient refractive thin film of FIG. 14 (*a*), and a fine periodic structure was formed as the anti-reflection structure 112. As the substrate 13 for forming such optical filter 14, ARTON film of 0.1 mm thickness (ARTON; Product Name, a product of JSR Corporation) was used. The substrate is not limited to this material, and a substrate made of a glass-based material or a resin material can be used.

<Regarding Gradient Refractive Index Thin Film>

The gradient refractive index thin film 12 was adjusted and fabricated by adjusting the film formation rate of $SiO_2$ and TiOx by meta-mode sputtering to combine these two materials, and continuously changing the refractive index in the film thickness direction so as to obtain desired absorbing characteristic. When the adhesion between the substrate and the thin film become an issue, an adhesion layer formed by a material such as a surfactant can be inserted. It is necessary to take care of the refractive index differences to the materials adjacent the adhesion layer. In this example, the multi-function film described above comprises a film including also such adhesion layer. Thus, the multi-function film becomes a function film comprising adhesion between the substrate and the thin film in addition to a desired whether resistance and light transmittance.

Such gradient refractive index film has a refractive index change such that the refractive index continuously increases and decrease from the substrate side and, its refraction index changes so as to approach the refractive indexes of the adjacent structures toward the interfaces on both ends of the gradient refractive index thin film, respectively. Further, the materials forming the interface regions were transparent and controlled so as to have a saturated oxide composition selected from the compositions, which can be prepared by the materials as described above, with the intention of reducing oxygen transfer, entry of steam form the adjacent materials. More in detail, the interfaces of both fine structure side and the substrate side were prepared so as to have $SiO_2$. The reflective index of $SiO_2$ film produced by the film forming method according to the present example was about 1.47, the refractive index of the substrate was about 1.52 and the refractive index of the fine structure was 1.51. The refractive index differences at both interfaces on the fine structure side and the substrate side became about 0.05 or less than 0.05. A multi-function film was obtained by forming the region prepared by the saturated oxide in the thickness of 50 nm as an enough thickness to express gas-barrier function.

Figure 15:
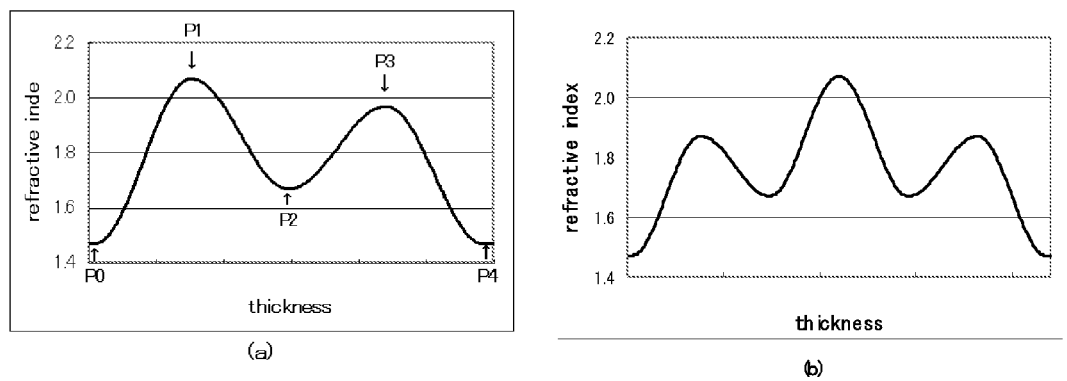
FIG. 15 illustrates refractive index profiles of the gradient refractive index thin films described in Example 3. A substrate is placed on the left side, and an anti-reflection structure is placed on the right side.

In the present Example 3, the gradient refractive thin film 12 had a structure with the refractive index profile as shown in FIG. 15 (*a*). The profile shown in FIG. 15 (*b*) by forming plural sets of a peak and a bottom of FIG. 15 (*a*) can be formed. However, the design was made without complication regarding easy control.

In the refractive index profile of FIG. 15(*a*), X of TiOx is fixed to about 1.5 from interface point PO to point P1 on the substrate side, and a continuous refractive index change was formed by changing the composition ratio with $SiO_2$.

Then, as starting at point P1, passing through point P2, and coming close to point P3, X of TiOx was continuously changed from 1.5 to 1.0. At the same time, the composition ratio with $SiO_2$ was changed; as approaching from point P1 to point P2, the composition ratio of $SiO_2$ with TiOx was increased, and further as approaching from point P2 to point P3, the composition ratio of $SiO_2$ to TiOx was decreased, thereby forming a continuous refractive index change.

Further, X of TiOx was fixed to about 1.0 from point P3 to interface point P4 on the anti-reflection structure side, and a continuous refractive index change was formed by changing the composition ratio with $SiO_2$. The vicinity of point P1 indicates the spectral transmission significantly affected by $Ti_2O_3$ and the vicinity of point P3 indicates the spectral transmission significantly affected by the TiO. Thus, in such a structure, the regions having different dispersion characteristics as illustrated in FIG. 5 in the visible wavelength region are mixed in the gradient refractive index thin film, and the desired transmission characteristic can be obtained by adjusting the degree of influence by the film thickness and the composition ratio. In the present example, these were adjusted so that the spectral transmission characteristic was flat-shaped in the visible wavelength region.

Figure 16:
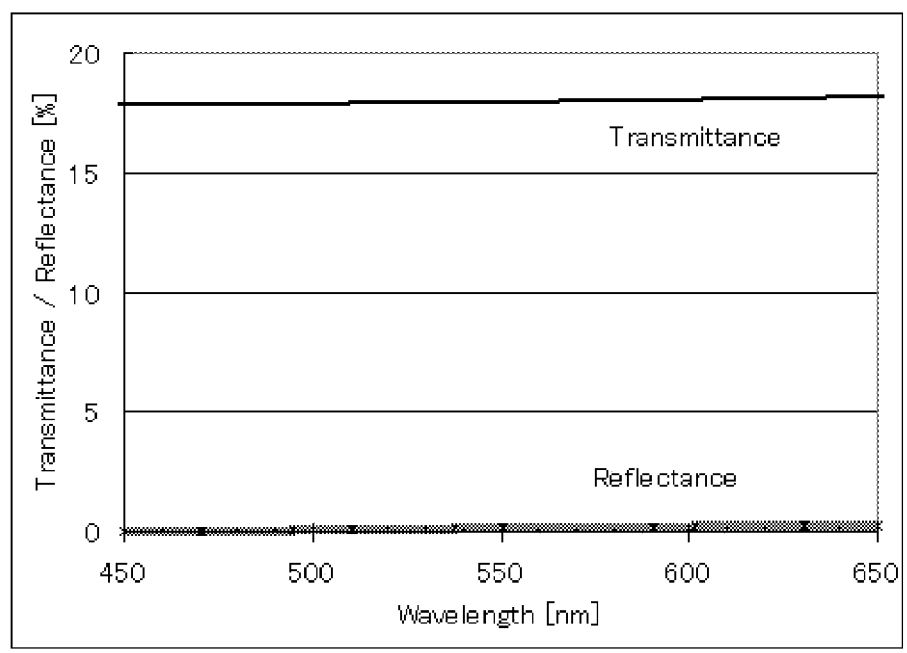
FIG. 16 illustrates a spectral reflectance characteristic of the optical filter fabricated in Example 3.

A refractive index profile with two mountains each of which had a refractive index up from 1.3 of the substrate to 2.1 and a refractive index down was formed to provide the absorption as shown in FIG. 16. The end point of the gradient refractive index thin film 12 was formed by $SiO_2$ regarding anti-reflection and environmental stability. Therefore, the refractive index of the end point of the gradient refractive index thin film 12 was about 1.47.

Meanwhile, if there are different refractive indexes not only in an interface between the substrate and the gradient refractive index thin film but also in an interface between the gradient refractive index thin film and the fine structure, reflection occurs according to the refractive index differences. In light of this, if there a problem with reflection in these interfaces, the refractive index difference are preferably minimized as much as possible. In the present example, the constituent materials for each structure were selected in advance regarding the refractive index differences between the multi-function film and the substrate, and the multi-function film and the fine structure, thereby adjusting each refractive index difference at the two interfaces to be 0.05 or less. In addition, the gradient refractive index thin film 12 was adjusted to have a film thickness of 800 nm. The thinner the film thickness of the gradient refractive index thin film is, the steeper the rate of change in refractive index from the substrate to the fine structure is. Thus, from the point of view of anti-reflection, a thicker film is preferable.

<Regarding Anti-Reflection Structure>

As described above, after a multi-function film 172 as the other multi-function film was formed continuously on one surface of a substrate 12 by the same process, a fine periodic structure 151 with a sub-micron pitch having anti-reflection effect as an anti-reflection structure, and an anti-reflection structure 112 were formed by an optical nanoimprint method using a UV curable resin on the multi-function film 172 and on the opposite surface of the substrate 13, respectively.

Various UV curable resins can be used for the fine periodic structure in a pillar array shape with a submicron pitch and the fine structure as the anti-reflection structure 112. PAK-01 (trade name) fabricated by Toyo Gosei Co., Ltd. was used and after polymerization curing, an adjustment was made so as to have a refractive index of 1.50.

Here, the above primer treatment was performed so that an adhesion layer was formed between the gradient refractive index thin film and the fine periodic structure, in order to increase adhesion between the gradient refractive index thin film and the fine periodic structure. Here, the multi-function film becomes a film also including the above adhesion layer. Thus, the multi-function film becomes a function film comprising adhesion between the gradient refractive index thin film and the fine periodic structure in addition to a desired whether resistance and light transmittance.

In the present example, a multi-function film is formed between a gradient refractive index thin film and a fine periodic structure formed thereon. As described above, a multi-function film (another multi-function film), such as a moisture barrier film (barrier film) having light transmittance or a gas barrier film having light transmittance, is preferably formed also between the substrate and the gradient refractive index thin film to improve environmental stability and keep the desired light transmittance as an optical filter. In such case, it is preferable to provide a desired light transmittance and environmental stability (whether resistance) to each multi-function film, in particular, regarding the multi-function film between the gradient refractive index gradient thin film and the fine periodic structure, it is preferable that a desired adhesion property regarding the structure of the fine periodic structure is provided to each multi-function film. Therefore, the multi-function films become a film with the composite function combining a barrier property for further improving environmental stability and, if necessary, an adhesion property according to the requirement in addition to a transmittance property suitable for the optical filter use. Each multi-function film can be formed by one (single) film or as a film structure with laminated plural layers, <Optical Filter Characteristics>

FIG. 16 illustrates the spectral reflectance characteristics and the spectral transmittance characteristics of the ND filter fabricated as described above. The density is about 0.75.

Spectrophotometer (U4100) fabricated by Hitachi High-Technologies Corporation was used for measurement.

The ND filters as fabricated above were put in a high temperature and high humidity test at 60° C., 90% humidity, transmittance at the wavelength of 540 nm of each filters were compared after an elapse of the test period of 1000 hours. The average change of all transmittances was 17.9% to 18.3%. Excellent transmittances could be obtained in comparison with the comparative example described below.

In the present example, Ti was used which can be comparatively easily oxidized to make the effect of the present invention clear. There is a case where the transmittance change can be smaller by a material such as Nb or Ni, which are more difficult to be oxidized. A high density thin film can be stably formed by using a spattering method in comparison with a vapor deposition method. Further, although, in the present example, oxides were used to control the refractive index, nitrides can be also used. The various chemical compounds can be used so that the refractive index change is continuous and periodic as the gradient refractive index thin film.

A buffer layer can be formed on the multi-function film. When the adhesion layer is provided as the buffer layer, examples of the adhesion layer forming materials include not only a silane coupling agent but also inorganic materials such as Cr, Ti, TiOx, TiNx, SiOx, SiNx, AlOx, and SiOxNy and various organic materials. Any adhesion layer forming material can be appropriately selected and used from well-known materials according to the material of the layer for increasing adhesion. The film thickness of the adhesion layer may be set so as to obtain the intended optical function and adhesion of the filter. The adhesion layer may be formed, for example, as a thin film of 10 nm or less.

Reference Example

An optical filter 24 is described below, which was fabricated in the same manner as Example 3 except that the multi-function film of tens of nanometers of the constant film thickness was not formed, while the same material compositions were used for both interfaces of the gradient refractive index thin film in the film thickness direction as Example 3, in order to consider the effect of the environmental stability in Example 3.

As shown in FIG. 3 (a), after a gradient refractive index thin film 12 was formed on one surface of a substrate 13, fine periodic structures 151, 152 were formed on the gradient refractive index thin film 12 and on the opposite surface of the substrate by an optical nanoimprint method. Although no multi-function film was formed, since the materials for the interfaces were the same, the almost same optical properties could be obtained.

Arton (Product Name) film of the thickness of 0.1 mm was used as the substrate 13 to fabricate such ND filter 14. $SiO_2$ and TiOx were formed by using a meta-mode sputtering method.

The ND filters as fabricated above were put in a high temperature and high humidity test at 60° C., 90% humidity, increasing rate of transmittance at the wavelength of 540 nm of each filters were confirmed after an elapse of the test period of 1000 hours. The average change of the transmittances was 17.9% to 18.8% as their average. Great change was indicated by the results, in particular in comparison with the ND filters fabricated in Example 1.

Example 4

Figure 17:
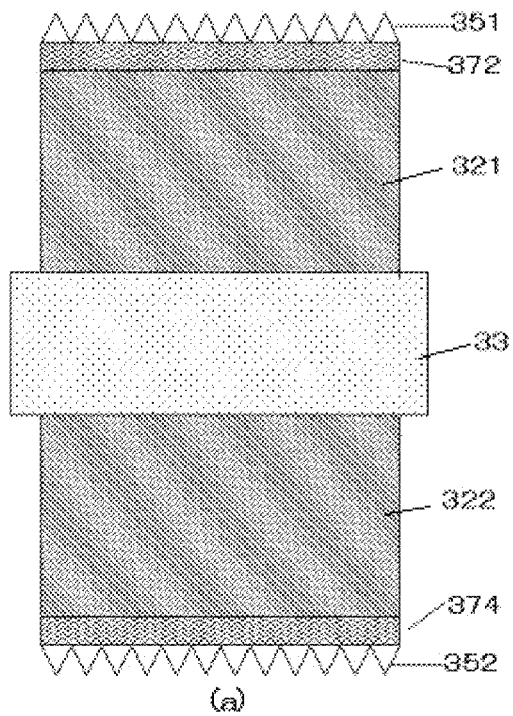
FIG. 17 illustrates structural examples of the optical filter described in Example 4.
Figure 17:
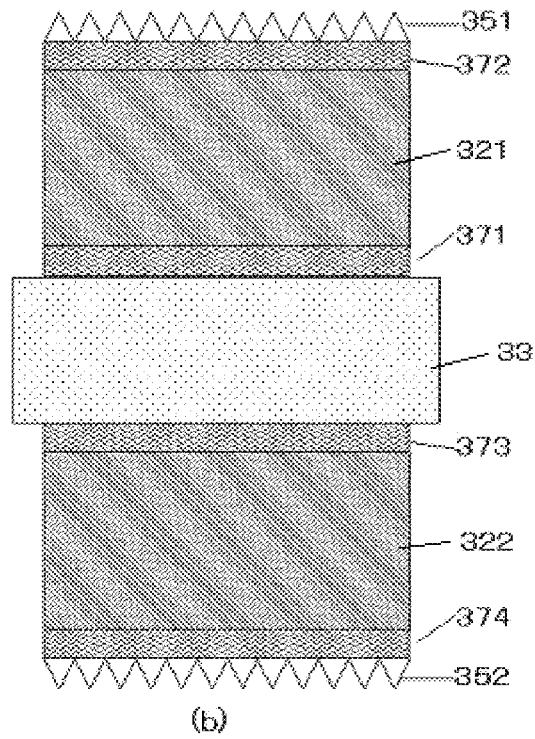

As the structural example other than Example 3 for fabrication of an optical filter, it is possible, for example, to arrange a gradient refractive index thin film, a fine structure and a multi-function film on both surfaces of a substrate, respectively, as shown in FIGS. 17 (a) and (b). Such structure can be applied to various optical filters. It is desirable to form a multi-function film to both interfaces of a gradient refractive index thin film in the film thickness direction. When the substrate is formed by a glass-based material such as BK7 or SFL-6, there is a case where the enough effect can be obtained also when the multi-function film is formed only on the fine structure side.

In Example 3, the multi-function file was formed by $SiO_2$ as the complete saturated oxide. However, when the following conditions are satisfied:

the gas barrier effect, the transmittance and the refractive index differences to the adjacent materials can be controlled in the desired values, and it is desired that the multi-function file can be formed continuously by the same producing process as the gradient refractive index thin film, it is not necessary to fix "X" as 2, X may be selected from "X=about 1.5 to about 2.0". When the transmittance is not necessary, "X" can be a desired value according to the objected refractive index and the gas barrier property. Nitrides such as SiNx can be selected. SiOxCy can be also selected. The other materials to form the multi-function film include not only SiOx, but also $Al_2O_3$, mixed films of $Al_2O_3$ and $SiO_2$, or AlOx, further, mixed films of AlOx and SiOy, SixNy films. Further, films of combination thereof are in particular preferable. "X" and "y" can be selected according to the desired gas barrier function and refractive index in the ranges up to their saturation in each composition.

Figure 18:
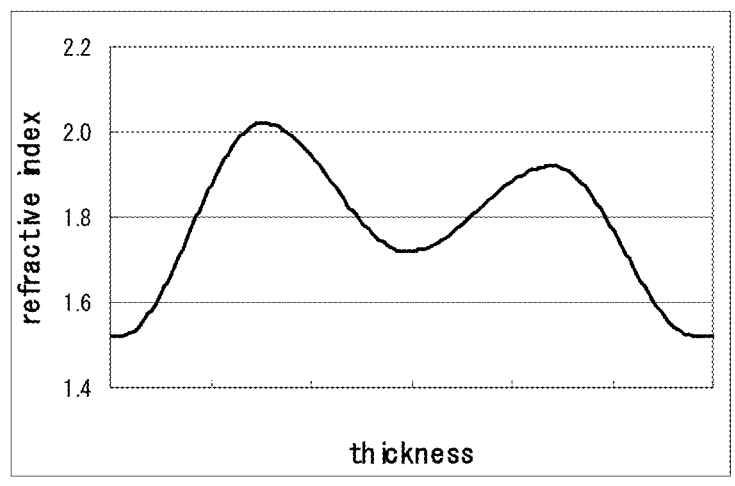
FIG. 18 illustrates refractive index profiles of the gradient refractive index thin films described in Example 4. A substrate is placed on the left side, and an anti-reflection structure is placed on the right side.
Figure 18:
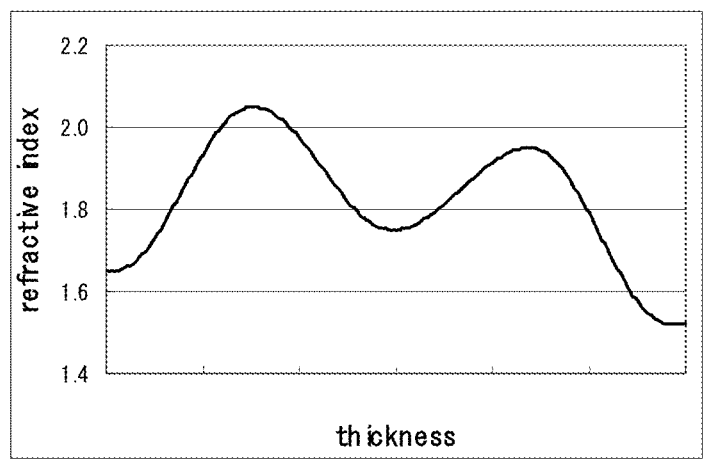

For example, in the structure of FIG. 17 (b), a multi-function film 371 of the thickness of 50 nm by mixing $Al_2O_3$ and $SiO_2$ was formed on BK7 substrate by a meta-mode sputtering process so as to have the refractive index profile as shown in FIG. 18 (a). Then, after a gradient refractive index thin film of the thickness of 800 nm was continuously formed by the same process, while the acid value of each material was changed, a multi-function film 372 was further continuously formed by mixing $Al_2O_3$ and SiOx by the same process. The multi-function film was controlled so as to have the refractive index of 1.52 by controlling the composition ratio of $Al_2O_3$ and SiOx. After the production of the multi-function film 372, the substrate 33 was turned over and the multi-function film 373, the gradient refractive thin film 322, the multi-function film 374 were formed so that they had the optical properties like as the multi-function film 371, the gradient refractive thin film 321, the multi-function film 372. Then, likewise, fine periodic structures 351, 352 were formed by the same optical nanoimprint method. In the optical filter fabricated as described above, the refract index of the substrate was about 1.52 and the refractive index of the gradient refractive index thin films was about 1.51. Since the gradient refractive index film and the multi-function film were continuously formed, the refractive index difference in each interface was controlled to 0.05 or less than 0.05.

The ND filters fabricated by controlling them so as to have the spectral characteristics very near those in Example 3 were put in a high temperature and high humidity test at 60° C., 90% humidity. Increasing rates of transmittance at the wavelength of 540 nm of each filters were confirmed after an elapse of the test period of 1000 hours. Although it is one example, the average change of the transmittances was 18.0% to 18.3%.

Furthermore, as the other fabrication example, the structure was obtained, in which the refractive index comprised monotonous increase from the end point on the substrate side, a changing point at which the slope of the refractive index change turned from plus to minus, a changing point with turn from minus to plus, a change so as to monotonously approach the refractive index of the end point on the anti-reflection side from a changing point, at which the slope turned from plus to minus, as shown in FIG. 18(b) based on the structure of FIG. 17 (b). $Al_2O_3$ of the thickness of 50 nm was formed by a meta-mode supporting process on a PET film substrate to form a multi-function film 371. Then, a gradient refractive index thin film 321 with the film thickness of 800 nm was continuously formed by the same process, while the acid value of TiOx was changed. Then, a film of the thickness of 50 nm was formed by continuously mixing $Al_2O_3$ and SiOx by the same process to obtain a multi-function film 372. The refractive index of the multi-function film 371 was about 1.65 and the composition ratio of $Al_2O_3$ and SiOx was controlled so that the refractive index of the multi-function film 372 was about 1.52. As the present example, the multi-function films 371, 372 can be formed by the different materials or the different composition ratio. After the fabrication of the multi-function film 372, a fine periodic structure was formed by the same optical nanoimprint method as Example 1. In the optical filter as produced above, the refractive index of the substrate was 1.61 and the refractive index of the fine periodic structure was about 1.51 and, since the gradient refractive index thin film and the multi-function film were continuously formed, the refractive index difference in each interface was controlled to 0.05 or less than 0.05.

The ND filters fabricated by controlling them so as to have the spectral characteristics very near those in Example 3 were put in a high temperature and high humidity test at 60° C., 90% humidity. Increasing rates of transmittance at the wavelength of 540 nm of each filters were confirmed after 1000 hours. Although it is one example, the average change of the transmittances was 17.2% to 17.5%.

In Examples 1 to 4, a mixed film of $SiO_2$ and TiOx was fabricated by meta-mode sputtering, and a gradient thin film having a continuous refractive index was formed by changing the mixing ratio in the film thickness direction. Without being limited to this, various metal or metalloid oxide materials such as NbOx, TaOx, ZrOx, AlOx, MoSiOx, MoOx, and WOx can be used. From the relation to the refractive index of the structure forming the interface with the aforementioned gradient refractive index thin film, considering the constraints on the process, any optimal material may be appropriately selected as long as the material can achieve the required refractive index. Materials including three or more kinds of metal or metalloid elements may be combined. The refractive index can be stably tilted by combining three or more kinds of materials, which facilitates adjustment of extinction coefficients such as reduction in absorption, thereby increasing freedom of design. At this time, not only oxide but also nitride can increase freedom of design as well.

Further, when reactive deposition or sputtering is used, the gradient thin film can be formed by controlling the introduced gas and controlling the refractive index and the extinction coefficient. The structure may be such that part of the gradient thin film in the film thickness direction has absorption, or the refractive index is continuously changed while having absorption on the whole. The film forming method is not limited to only the meta-mode sputtering method, but other sputtering methods and various deposition methods may be used.

The gradient refractive index thin film formed according to the present example becomes a high density film and may cause a problem with film stress. In this case, the use of a substrate such as glass with high rigidity can reduce problems such as warping due to film stress. Alternatively, a gradient refractive index thin film formed on both surfaces of the substrate, respectively, can cancel film stress with each other, thereby producing stable optical filters.

In particular, the structure of providing the gradient refractive index thin film and the fine periodic structure on both surfaces of the substrate used in the present example can provide stability of the substrate to the film stress. The effect to prevent wrapping of the substrate by forming the film on both surfaces of the substrate becomes greater when a thin resin substrate is used. In addition, both surfaces of the fine periodic structure can be subjected to optical nanoimprint to form the anti-reflection structure by a series of continuous or simultaneous process, which is excellent in productivity.

Furthermore, when the gradient refractive index thin film was formed at least one of oxides of metals or metalloids as described above, the multi-function film can be formed by the material including at least one metal or metalloid forming the gradient refractive index thin film. Alternatively, the multi-function film can be formed by the material including at least one saturated oxide of the oxide, i.e., the oxide containing oxygen to the saturate state, which is included in the gradient refractive index thin film. Using such structure, reflection can be effectively reduced in their interfaces by changing the refractive index change continuously or stepwise from the gradient refractive index thin film to the multi-function film. When the refractive index change is stepwise, the adjacent parts can be formed such that the refractive index change can be in the range acceptable for an optical filter. As the changing point at which plus or minus of the slope changes, the part with a desired constant refractive index in the film thickness can be set.

Example 5

Next, an example relating to an application of a light diaphragm device with a ND filter according to the present invention to an imaging optical system such as a video camera is explained below based on FIG. 19.

Figure 19:
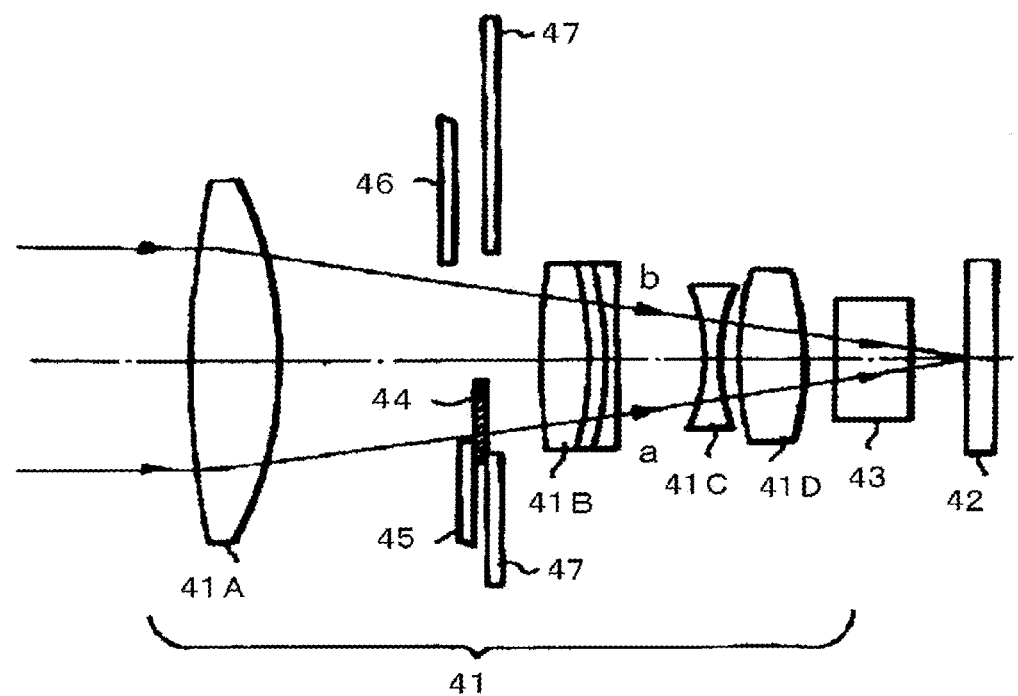
FIG. 19 illustrates an explanatory drawing of an optical system of an optical imaging device using the ND filter in Example 5.

In FIG. 19, an imaging optical system 41 including lens units 41A to 41D is indicated by 41. A solid-state imaging element such as a CCD is indicated by 42, which receives images of light beams a and b formed by the imaging optical system 41 and converts the images into electrical signals. An optical low-pass filter is indicated by 43. The imaging optical system 41 has a light diaphragm device comprising an ND filter 44, diaphragm blades 45 and 46, and supporting plates 47.

The aperture of the light diaphragm device suitable for use in the imaging system such as a video camera or a digital still camera is provided to control the amount of light incident on a solid-state imaging element such as a CCD or CMOS sensor. The light diaphragm device is structured so as to be narrowed to be smaller by controlling diaphragm blades 45 and 46 as the object field becomes brighter. At this time, as a countermeasure to degradation of image quality which occurs in a state of small aperture state, an ND filter 44 is arranged near the aperture, thereby allowing the aperture of the diaphragm to be larger even if the brightness of the object field is the same. The incident light passes through the light diaphragm device and reaches to a solid state imaging element (not shown in the figure), and converted into electronic signal to form an image.

According to the structures in the above examples, a ND filter with small resolution reduction can be provided. The device using the ND filter with the gradient refractive index thin film produced in the present Example 1 or 2 as the ND filter 44 has good productivity, light weight and excellent color balance. The light diaphragm device as fabricated above can markedly reduce defects such as ghost caused by reflection by the filter.

Regarding the device using the ND filter with the gradient refractive index thin film produced in the present Example 3 or 4 as the ND filters 44, no color balance difference was recognized also by comparing the images just after the assembling of the device and the images one month later after the assembling of the device.

The optical diaphragm device fabricated by using the ND filter according to the present Example 3 or 4 can markedly reduce defects such as ghost caused by reflection by the filter and have excellent environmental resistance.

Application is not limited to the above examples. The good productivity can be obtained and defects caused by reflection by the filter on the device can be markedly reduced by using the optical filter produced in Example 1 or 2 to the other optical apparatuses. Excellent environmental resistance can be obtained and defects caused by reflection by the filter on the device can be markedly reduced by applying the optical filter produced in Example 3 or 4 to the other optical apparatuses.

Other Examples

Optical filters other than the ND filter described in Examples 1 to 4, in particular Examples 1 and 2, can also be expected to have similar effects, when the filter is an absorption type. For example, these optical filters can be applied to a protective film or plate for anti-reflection to reduce reflection in the desired wavelength such as a filter to protect an object such an imaging device or a poster to be protected. When the optical filter is used for a protective plate of a touch-panel, an electronic device can be provided in which visibility of the display can be improved. When the optical filter is a light adsorption type, the optical filter can be applied to a color filter, an IR cut-off filter, a fluorescent filter, a various band filter, an edge filter. Reflection can be reduced by applying the optical filer according to the present invention. Various optical devices can be provided by loading these optical filters, in which the problems as described above can be improved.

Application is not limited to the above examples. The good productivity can be obtained and defects caused by reflection by the filter on the device can be markedly reduced by applying the optical filter produced in Example 1 or 2 to the other optical apparatuses.

For example, according to the present invention, an optical filter with excellent environmental resistance and markedly reduced reflection can be realized by placing, as the base of a fine structure to be formed, a multi-function film on a gradient refractive index thin film with a refractive index change in the film thickness direction formed on a light transmitting substrate.

The following structures are concretely preferable:

(1) An optical filter characterized in comprising
a light-transmitting substrate,
a gradient refractive index thin film with a refractive index change in the film thickness direction formed on the substrate,
a light-transmitting multi-function film formed on the gradient refractive index thin film,
wherein a fine structure with an pitch shorter than visible light wavelength is formed on the multi-function film.

(2) The optical filter according to the above Section (1), wherein another multi-function film is formed between the gradient refractive index thin film and the substrate.

(3) The optical filter according to the above Section (2), wherein,
the gradient refractive index thin film has a characteristic comprising a changing point, at which plus or minus of a slope of the gradient refractive index change in the film thickness direction changes, and which form the refractive index change monotonously approaching at least one of the refractive indexes of the end point on the substrate side and the end point of the fine structure side; and
in the another multi-function film formed on the substrate side, the refractive index difference between the refractive index of the another multi-function film and the refractive index of the end point on the substrate side in the refractive index change of the gradient refractive index thin film in the film thickness direction is smaller than the refractive index difference between the refractive index of the another multi-function film and the refractive index of the changing point.

(4) The optical filter according to any one of the above Sections (1) to (3), wherein
the gradient refractive index thin film has a characteristic comprising a changing point, at which plus or minus of a slope of the gradient refractive index change in the film thickness direction changes, and which form the refractive index change approaching at least one of the refractive indexes of the end point on the substrate side and the end point of the fine structure side
in the multi-function film formed on the fine structure side, the refractive index difference between the refractive index of the multi-function film and the refractive index of the end point on the fine structure side in the refractive index change of the gradient refractive index thin film in the film thickness direction is smaller than the refractive index difference between the refractive index of the multi-function film and the refractive index of the changing point.

(5) The optical filter according to any one of the above Sections (1) to (4), wherein the refractive index difference between the end point on the multi-function film side of the refractive index change of the gradient refractive index thin film and the multi-function film, and the refractive index difference between the multi-function film and the fine structure are 0.05 or less than 0.05.

(6) The optical filter according to any one of the above Sections (1) to (5), wherein the gradient refractive index thin film comprises a metal or a metalloid element, and the multi-function film comprises at least one of the saturated oxides of the oxides forming the gradient refractive index thin film.

(7) The optical filter according to any one of the above Sections (1) to (6), wherein the multi-function film consists of an oxide comprising at least one of Al and Si.

(8) The optical filter according to any one of the above Sections (1) to (7), wherein the multi-function film consists of an oxide comprising Al and Si.

(9) The optical filter according to any one of the above Sections (1) to (8), wherein the multi-function film comprises one or more metals or metalloid elements.

(10) The optical filter according to any one of the above Sections (1) to (9), wherein the fine structure comprises a periodic structure in a pitch shorter than visible light wavelength.

(11) The optical filter according to any one of the above Sections (1) to (10), wherein the gradient refractive index thin film comprises, in the film thickness direction, a region where a spectral transmission characteristic of a visible wavelength region increases as approaching a long wavelength side; and a region where the spectral transmission characteristic of the visible wavelength region decreases as approaching the long wavelength side in a film thickness direction thereof.

(12) The optical filter according to any one of the above Sections (1) to (11), wherein the multi-function film comprises a function as an adhesion film of the fine structure.

(13) An optical apparatus characterized in using the optical filter according to any one of the above Sections (1) to (12) in an imaging optical system.

(14) An electronic device characterized in using the optical filter according to any one of the above Sections (1) to (12) in a display.

The examples explained above are the representative examples of the present invention. Various changes or modifications can be made to carry out the present invention. For example, regarding the parts having the same names in Examples 1 & 2 and Examples 3 & 4, respectively, the same fabrication methods and the same materials for each part can be also applied in each example.

The present application has the priority claimed based on Japanese Patent Application No. 2012-252698 filed on Nov. 16, 2012 and Japanese Patent Application No. 2012-252709 filed on Nov. 16, 2012. The entire descriptions of these Japanese patent applications are involved in the present application as the references.

REFERENCE SIGNS LIST 111, 112, 211, 212 anti-reflection structure
12, 221, 222 gradient refractive index thin film
13, 23, 33 substrate
15, 25, 151, 152, 251, 252, 351, 352 fine periodic structure
16, 26, 161, 162, 261, 262 anti-reflection film
41 imaging optical system
41A, 41B, 41C, 41D lens unit
42 solid-state imaging element
43 optical low-pass filter
44 ND filter
45, 46 Diaphragm blade
47 supporting plate

The invention claimed is:

1. An optical filter comprising:
a light-transmitting substrate;
a gradient refractive index thin film with a refractive index change in the film thickness direction formed on the substrate; and
an anti-reflection structure formed on the gradient refractive index thin film,
wherein the gradient refractive index thin film has a light absorption property and a gradient refractive index property such that the refractive index change comprises plural changing points, each of which has an increase and a decrease of the refractive index,
wherein the gradient refractive index thin film has a gradient refractive index property comprising plural local maximum value points, at each of which the refractive index turns to reduction after increase, as the plural changing points in the refractive index change,
wherein the gradient refractive index thin film has a gradient refractive index property in that, of the plural local maximum value points, the local maximum value point nearest to the substrate is the global maximum value point of the refractive index change, and
wherein the gradient refractive index thin film comprises, in the film thickness direction thereof:
(a) a region where a spectral transmission characteristic of a visible wavelength region increases as approaching a long wavelength side; and
(b) a region where the spectral transmission characteristic of the visible wavelength region decreases as approaching the long wavelength side.

2. The optical filter according to claim 1, wherein the anti-reflection structure comprises a multi-layer film.

3. The optical filter according to claim 1, wherein the anti-reflection structure comprises a fine structure having a pitch shorter than a wavelength of visible light.

4. The optical filter according to claim 1, wherein the substrate is a transparent resin substrate with transmittance of ray of light of 89%, or more than 89%.

5. An optical apparatus using an optical filter in an imaging optical system, wherein the optical filter is the optical filter according to claim 1.

6. An optical filter comprising:
a light-transmitting substrate; and
a light-absorbing gradient refractive index thin film with a refractive index change in the film thickness direction formed on the substrate; and
an anti-reflection structure formed on the substrate,
wherein the refractive index change of the gradient refractive index thin film comprises (a) plural slope-changing regions of the refractive index, each of which has a portion where the slope of an increase rate of the refractive index changes from plus to minus as a local maximum value point, and (b) plural changing points with increase and decrease,
wherein the relation of the refractive index of the substrate, the refractive indexes of the local maximum value points corresponding to the plural slope-changing regions, and the refractive index of the anti-reflection structure comprises a change from a monotonous increase to a monotonous decrease from the side of the substrate toward the side of the anti-reflection structure,
wherein the gradient refractive index thin film has a gradient refractive index property comprising plural local maximum value points, at each of which the refractive index turns to reduction after increase, as the plural changing points in the refractive index change,
wherein the gradient refractive index thin film has a gradient refractive index property in that, of the plural local maximum value points, the local maximum value point nearest to the substrate is the global maximum of the refractive index change, and
wherein the gradient refractive index thin film comprises, in the film thickness direction thereof:
(a) a region where a spectral transmission characteristic of a visible wavelength region increases as approaching a long wavelength side; and
(b) a region where the spectral transmission characteristic of the visible wavelength region decreases as approaching the long wavelength side.

7. The optical filter according to claim 6, wherein the anti-reflection structure comprises a multi-layer film.

8. The optical filter according to claim 6, wherein the anti-reflection structure comprises a fine structure having a pitch shorter than a wavelength of visible light.

9. The optical filter according to claim 8, further comprising a multi-function film having light-absorption property formed on the gradient refractive index thin film and consisting of a composition different from the gradient refractive index thin film,
wherein a fine structure is formed on the multi-function film.

10. The optical filter according to claim 9, wherein the multi-function film comprises an oxide containing at least one of Al and Si.

11. The optical filter according to claim 10, wherein the multi-function film comprises an oxide containing Al and Si.

12. The optical filter according to claim 9, wherein the gradient refractive index thin film comprises an oxide of a metal or a metalloid, and wherein the multi-function film is formed by at least a saturated oxide of the oxide forming the gradient refractive index thin film.

13. The optical filter according to claim 6, wherein the substrate is a transparent resin substrate with transmittance of ray of light of 89%, or more than 89%.

14. An optical apparatus using an optical filter in an imaging optical system, wherein the optical filter is the optical filter according to claim 6.

15. An optical filter comprising:
a light-transmitting substrate;
a gradient refractive index thin film with a refractive index change in the film thickness direction formed on the substrate;
an anti-reflection structure formed on the gradient refractive index thin film,
wherein the gradient refractive index thin film has a light absorption property and a gradient refractive index property such that the refractive index change comprises plural changing points, each of which has an increase and a decrease of the refractive index,
wherein the gradient refractive index thin film has a gradient refractive index property comprising plural local maximum value points, at each of which the refractive index turns to reduction after increase, as the plural changing points in the refractive index change,
wherein the gradient refractive index thin film has a gradient refractive index property in that, of the plural local maximum value points, the local maximum value point nearest to the substrate is the global maximum value point of the refractive index change, and
wherein the gradient refractive index thin film comprises, in the film thickness direction thereof, a region changing from a region where a spectral transmission characteristic of a visible wavelength region increases as approaching a long wavelength side to a region where the spectral transmission characteristic of the visible wavelength region decreases as approaching the long wavelength side.

16. An optical apparatus using an optical filter in an imaging optical system, wherein the optical filter is the optical filter according to claim 15.

17. An optical filter comprising:
a light-transmitting substrate;
a light-absorbing gradient refractive index thin film with a refractive index change in the film thickness direction formed on the substrate; and
an anti-reflection structure formed on the substrate,
wherein the refractive index change of the gradient refractive index thin film comprises (a) plural slope-changing regions of the refractive index, each of which has a portion where the slope of an increase rate of the refractive index changes from plus to minus as a local maximum value point, and (b) plural changing points with increase and decrease,
wherein the relation of the refractive index of the substrate, the refractive indexes of the local maximum value points corresponding to the plural slope-changing regions, and the refractive index of the anti-reflection structure comprises a change from a monotonous increase to a monotonous decrease from the side of the substrate toward the side of the anti-reflection structure,
wherein the gradient refractive index thin film has a gradient refractive index property comprising plural local maximum value points, at each of which the refractive index turns to reduction after increase, as the plural changing points in the refractive index change,
wherein the gradient refractive index thin film has a gradient refractive index property in that, of the plural local maximum value points, the local maximum value point nearest to the substrate is the global maximum of the refractive index change, and
wherein the gradient refractive index thin film comprises, in the film thickness direction thereof a region changing from a region where a spectral transmission characteristic of a visible wavelength region increases as approaching a long wavelength side to a region where the spectral transmission characteristic of the visible wavelength region decreases as approaching the long wavelength side.

18. An optical apparatus using an optical filter in an imaging optical system, wherein the optical filter is the optical filter according to claim 17.

* * * * *